(12) United States Patent
Liu et al.

(10) Patent No.: US 9,176,920 B2
(45) Date of Patent: Nov. 3, 2015

(54) MULTI-LEVEL ENCODED DATA TRANSFER

(71) Applicant: SanDisk Technologies Inc., Plano, TX (US)

(72) Inventors: Michael Ming-Chang Liu, Union City, CA (US); Darmin Jin, Fremont, CA (US)

(73) Assignee: SanDisk Technologies Inc., Plano, TX (US)

( * ) Notice: Subject to any disclaimer, the term of this patent is extended or adjusted under 35 U.S.C. 154(b) by 264 days.

(21) Appl. No.: 13/659,713

(22) Filed: Oct. 24, 2012

(65) Prior Publication Data

US 2014/0115375 A1    Apr. 24, 2014

(51) Int. Cl.
 G06F 13/42  (2006.01)
 G06F 1/08   (2006.01)
 G06F 1/12   (2006.01)

(52) U.S. Cl.
 CPC .............. *G06F 13/4295* (2013.01); *G06F 1/08* (2013.01); *G06F 1/12* (2013.01)

(58) Field of Classification Search
 CPC ........................... G06F 13/4282; G06F 13/295
 See application file for complete search history.

(56) References Cited

U.S. PATENT DOCUMENTS

| | | | |
|---|---|---|---|
| 4,357,634 A | 11/1982 | Chung | |
| 4,373,154 A * | 2/1983 | Balme et al. | 341/58 |
| 6,694,416 B1 | 2/2004 | Thomann et al. | |
| 7,400,178 B2 | 7/2008 | Wong | |
| 7,605,737 B2 * | 10/2009 | Payne et al. | 341/155 |
| 7,728,619 B1 | 6/2010 | Tzou et al. | |
| 7,791,478 B2 | 9/2010 | Posamentier | |
| 7,814,359 B2 | 10/2010 | Bae et al. | |
| 8,069,363 B2 | 11/2011 | Roth et al. | |
| 2003/0142691 A1 * | 7/2003 | Hartmann | 370/442 |
| 2005/0134307 A1 | 6/2005 | Stojanovic et al. | |
| 2006/0109917 A1 | 5/2006 | Fonseka | |
| 2008/0291063 A1 | 11/2008 | Hollis | |
| 2009/0003484 A1 | 1/2009 | Li | |
| 2010/0046670 A1 | 2/2010 | Tsui et al. | |
| 2010/0103954 A1 | 4/2010 | Cerreta et al. | |

OTHER PUBLICATIONS

International Search Report and Written Opinion for PCT/US2013/066227 filed Oct. 22, 2013, search report mailed Apr. 1, 2014.
International Preliminary Report on Patentability dated Apr. 28, 2015, International Application No. PCT/US2013/066227.

* cited by examiner

*Primary Examiner* — Jaweed A Abbaszadeh
*Assistant Examiner* — Wai Yip
(74) *Attorney, Agent, or Firm* — Vierra Magen Marcus LLP

(57) ABSTRACT

Multi-level encoded data transfer is disclosed. $2^n$ bits may be encoded in a data signal each half clock cycle. For example, four bits may be transferred each clock cycle. Prior to data transfer, each data line may have two bits ready to be encoded. The two bits may be encoded to one of four different data states. The clock may be divided into four intervals for each half clock cycle, with each interval corresponding to one of the four data states. The two bits may be encoded into the data signal based on the interval that corresponds to the data state. As one example, the data signal could transition during the interval that corresponds to the data state for the two bits. This encoding may be repeated for two other bits for the other half of the clock cycle. Thus, QDR or some other data rate may be achieved.

19 Claims, 16 Drawing Sheets

MULTI-LEVEL ENCODED DATA TRANSFER

BACKGROUND

1. Field

The present disclosure relates to data transfer.

2. Description of the Related Art

Popular ways of transferring data in applications such as memory accesses are Single Data Rate (SDR), Double Data Rate (DDR) and Quad Data rate (QDR). SDR typically transfers one unit of data per clock cycle. By a unit of data it is meant that data may be sent in parallel on several data lines. For example, a memory device might have eight Input/Output (I/O) lines. Thus, each individual I/O line might transfer one bit of data per clock cycle. The clock being referred to here may be a clock that is shared by a transmitter and a receiver.

For DDR, data may be transferred on both the rising and falling edges of the clock signal. Therefore, DDR may send twice the amount of data as SDR in the same time period.

In QDR, data may be sent at four different points in the clock cycle. For example, data could be sent on a rising edge of the clock, between the rising and a falling edge, the falling edge of the clock, and between the falling edge and the next rising edge. Therefore, QDR may transmit four times the data per clock cycle as SDR.

DETAILED DESCRIPTION

Techniques are disclosed herein for transferring data in situations such as, but not limited to, memory accesses.

For purpose of illustration, an example in which four bits of data may be transferred in each clock cycle (per data line) will be discussed. In one embodiment, four bits may be transferred each clock cycle. However, the data signal need only transition at most twice each clock cycle. Two bits may be transferred each half of the clock cycle. Prior to data transfer, each data line may have two bits ready to be encoded. The two bits are encoded to one of four different data states. The clock signal may be divided into four intervals for each half clock cycle, with each interval corresponding to one of the four data states. The two bits may be encoded into the data signal based on the interval that corresponds to the data state. As one example, the data signal could transition during the interval that corresponds to the data state for the two bits. This encoding may be repeated for two other bits for the other half of the clock cycle. Therefore, four bits may be transferred each clock cycle while transitioning the signal at most twice, in one embodiment. Thus, quad data rate may be achieved.

Other data rates may be achieved. In one embodiment, $2^n$ bits are encoded in the data signal each half clock cycle. The clock signal may be divided into $2^n$ time intervals for every half clock cycle. In the previous example, two bits are encoded in the data signal each half clock cycle. However some other number of bits might be encoded. For example, three bits could be encoded in the data signal during each half clock cycle. The three bits correspond to eight different data states. In this embodiment, the data signal can be divided into eight periods during each half clock cycle, with each period corresponding to one of the eight data states. Thus, six bits may be transferred each clock cycle in one embodiment.

In some of the previous examples, the data signal is divided into $2^n$ time intervals for each half clock cycle. However, some period other than a half clock cycle could be used. In one embodiment, the data signal is divided into $2^n$ time intervals for each clock cycle. In one embodiment, the data signal is divided into $2^n$ time intervals for every two clock cycles.

Figure 1:
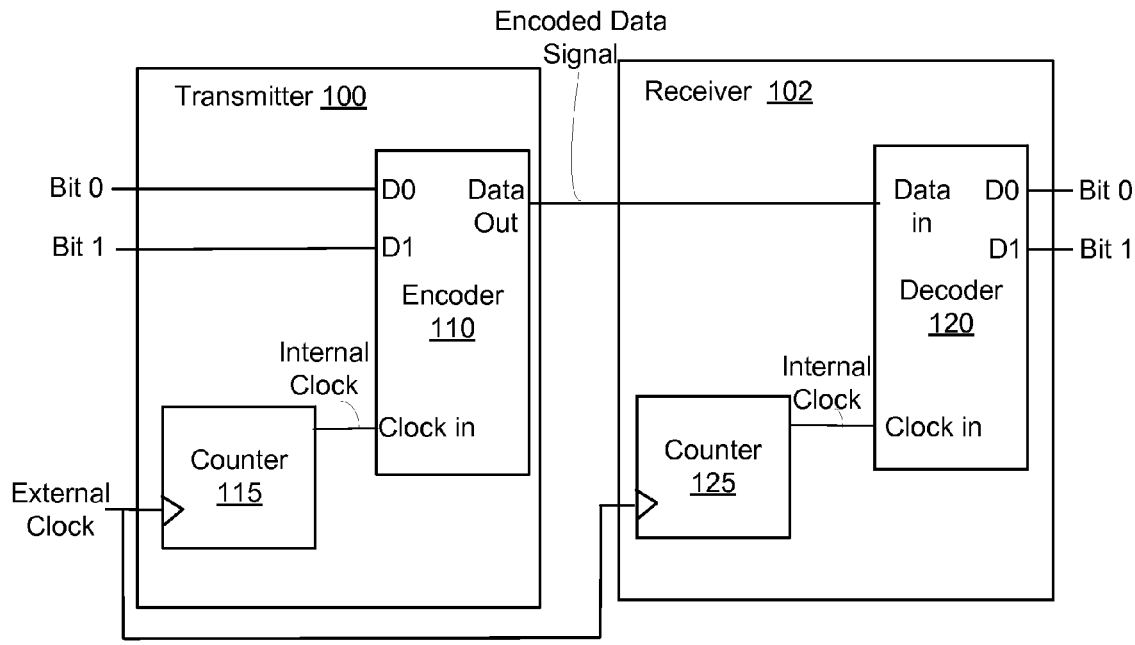
FIG. 1 depicts a block diagram of one embodiment of a transmitter and a receiver.
Figure 4:
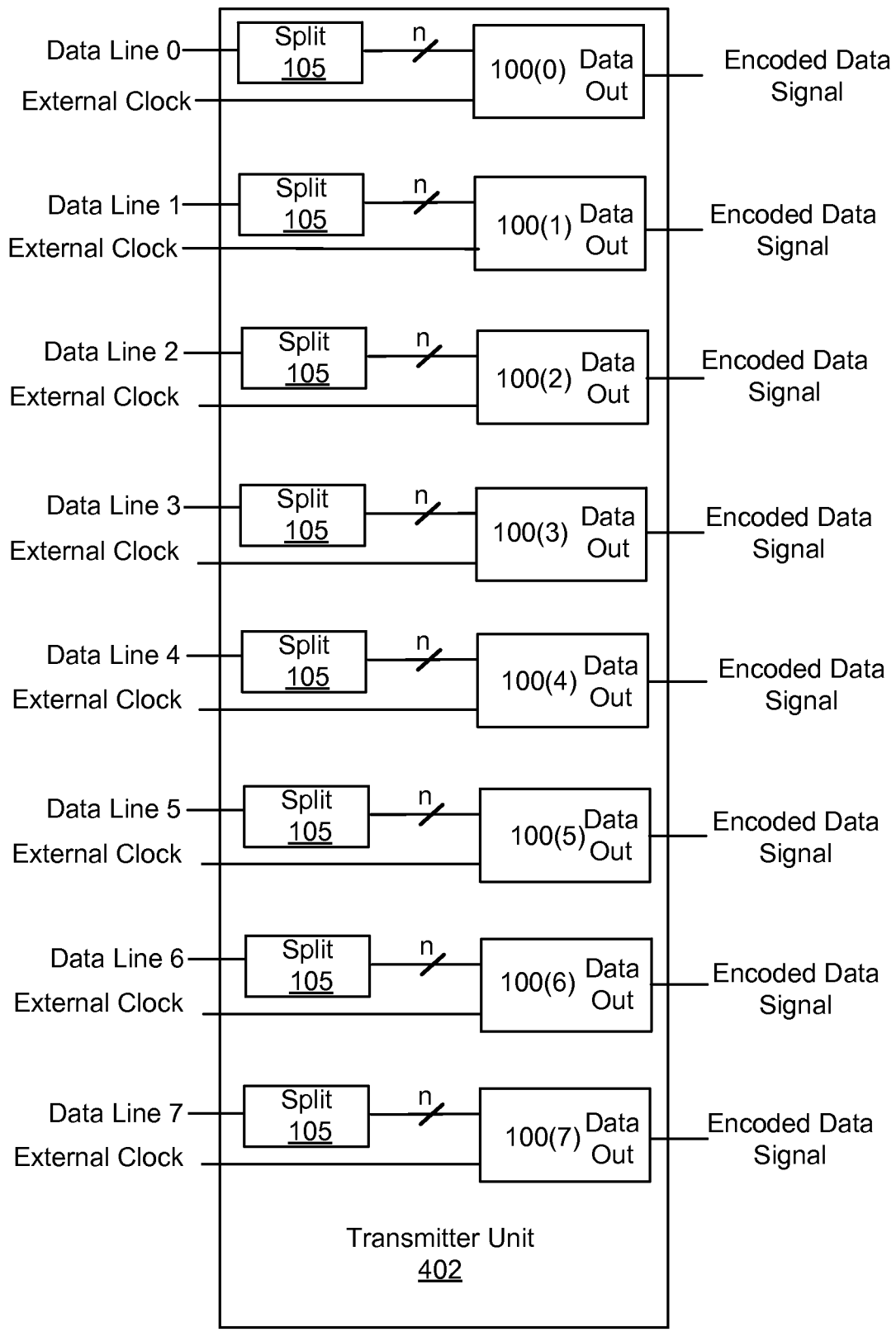
FIG. 4 is a diagram of one embodiment of a transmitter unit that includes eight transmitters, each of which outputs an encoded data signal.

FIG. 1 depicts a block diagram of one embodiment of a transmitter and a receiver. The transmitter 100 includes an encoder 110 and a counter 115. The receiver 102 includes a decoder 120 and a counter. Other elements are not depicted so as to not obscure the diagram. The transmitter 100 and receiver 102 are used to process one data line, in one embodiment. In this embodiment, two bits are transferred on the data line. In other embodiments, three or more bits could be transferred on the single data line. The data line is not depicted in FIG. 1. FIG. 4, to be discussed below, shows one embodiment of a transmitter unit that processes eight data lines.

In general, the transmitter 100 of FIG. 1 inputs two bits of information Bit 0, Bit 1 and outputs an encoded data signal that encodes the two bits per some section of the external clock. The external clock signal is input to the transmitter 100 and to the receiver 102. In general, the receiver 102 inputs the encoded data signal and outputs two bits of information Bit 0, Bit 1.

In one embodiment, the encoder 110 encodes the two data bits Bit 0, Bit 1 into one of four data states. In one embodiment, the decoder 120 inputs the encoded data signal and decodes the encoded data signal into two bits, Bit 0, Bit 1. The encoded data signal (in the embodiment of FIG. 1, as well as other embodiments discussed herein) may be transferred between the transmitter 100 and receiver 102 in a variety of ways. In one embodiment, the encoded data signal is transferred on a physical data line. The physical line may be electrically conductive, an optical medium (e.g., optical fiber), etc. In one embodiment, the encoded data signal is transferred wirelessly. The encoded data signal may be transferred by different voltage levels on an electrically conductive line, via an RF signal, IR signal, optical signal, etc.

The transmitter 100 and receiver 102 of the embodiment of FIG. 1, as well as other transmitters and receivers discussed herein, may be implemented in a variety of manners. Accordingly, aspects of the present disclosure may be implemented entirely in hardware, entirely in software (including firmware, resident software, micro-code, etc.) or combining software and hardware. Implementations may use a variety of elements such as logic gates, registers, discrete components (e.g., resistors, transistors, capacitors, etc.), programmable circuits, application specific integrated circuits, etc.

FIGS. 2(A)-2(E) depict one embodiment of timing of clock and data signals for the transmitter 100 of FIG. 1. FIG. 2A depicts the external clock signal, which may be input to the counter 115 of the transmitter 100. The labels Group 0, Group 1, etc. are shown in association with the external clock signal. Each Group corresponds to one half of the external clock cycle. Each group may correspond to some group of data that is to be encoded into the encoded data signal. For example, each group may correspond to a pair of input bits Bit 0, Bit 1. Thus, each half clock cycle there will be a new group. In one embodiment, the duty cycle of the external clock is 50%.

FIG. 2B depicts an internal clock signal that may be generated from the external clock by the counter 115. In this example, the internal clock signal is divided into four intervals for each half clock cycle. Stated another way, the internal clock signal is divided into four intervals for each Group. The four intervals are labeled as T0, T1, T2, and T3. Each of these intervals may correspond to one data state.

One example mapping of time interval to data states is shown in Table I. The mapping employs gray level coding, although gray level coding is not required.

TABLE I

| D0 | D1 | Time |
| --- | --- | --- |
| 0 | 0 | T0 |
| 0 | 1 | T1 |
| 1 | 1 | T2 |
| 1 | 0 | T3 |

FIG. 2C depicts an example data out signal output by the encoder 110 for one embodiment. This is referred to as Option A. The data out signal is the encoded data signal. In this embodiment, the encoded data signal does not transition during T0 in the event that the data is "00." Thus, T0 may be referred to as a default state. In the example of FIG. 2C, the transitions per group are as in Table II.

TABLE II

| Data in | | Group | Transition |
| --- | --- | --- | --- |
| D0 | D1 | | |
| 0 | 1 | 0 | T1 |
| 1 | 0 | 1 | T3 |
| 0 | 0 | 2 | none |
| 1 | 1 | 3 | T2 |
| 1 | 1 | 4 | T2 |

FIG. 2D depicts an example data out signal output by the encoder 110 for one embodiment. This is referred to as Option B. In this embodiment, the encoded data signal does transition during T0 in the event that the data is "00." For the example of FIG. 2D, the data signal transitions per group are shown in Table III.

TABLE III

| Data in | | Group | Transition |
| --- | --- | --- | --- |
| D0 | D1 | | |
| 0 | 1 | 0 | T1 |
| 1 | 0 | 1 | T3 |
| 0 | 0 | 2 | T0 |
| 1 | 1 | 3 | T2 |
| 1 | 1 | 4 | T2 |

FIG. 2E depicts a general format for a data out signal of the encoder 110. The data out signal transmits Y0, Y1 during the first half of the first external clock cycle (Group 0), Y2, Y3 during the second half of the first external clock cycle (Group 1), Y4, Y5 during the first half of the second external clock cycle (Group 2), etc. Here, the "Ys" refer to data bits. Thus, two bits are encoded into the data signal for each half cycle of the external clock.

FIG. 3A-3H depict one embodiment of timing of clock and data signals for the receiver 102 of FIG. 1. FIG. 3A shows the external clock, which may be synchronized with the external clock that is input to the transmitter 100. The external clock may also be synchronized with the encoded data signal. Note that there may be some delay in transferring of the encoded data signal at the transmitter 100 and the reception of it at the receiver 102. Also, there may be some delay in processing the various signals in circuitry in the receiver 102.

FIG. 3B depicts an internal clock signal that may be generated from the external clock by the counter 125. This internal clock may resemble the internal clock that is generated by the counter 115 of the transmitter 100. As can be seen, the receiver's internal clock signal is at four times the frequency as the external clock, in this embodiment.

FIGS. 3C-3F are four timing signals referred to as Timing (T0) to Timing (T3), respectively. Each of these timing signals is low for one of the time intervals of the internal clock, and high for the other three time intervals. For example, T0 is low for time period T0, and high for time intervals T1, T2 and T3. The signals T0-T3 could be inverted such that they are high during one time interval and low for the other three. The signals T0-T3 are used to decode the encoded data signal in one embodiment.

FIG. 3G depicts an encoded data signal that is input to the decoder 120 for one embodiment. This embodiment corresponds to the Option A embodiment for the transmitter 100 depicted in FIG. 2C. Recall that for Option A, the data signal did not transition if the data state corresponded to T0.

Dashed lines are shown between the transitions in the Data In signal of FIG. 3G and various ones of the timing signals Timing (T0) to Timing (T3). In one embodiment, the decoder 120 matches the transitions in the Data In signal to the various timing signals Timing (T0) to Timing (T3) to determine which time interval the transition occurred in. Thus, the encode data signal may be decoded. For example, the first transition corresponds to signal Timing (T1) (FIG. 3D) and the second transition corresponds to signal Timing (T3) (FIG. 3F). Note that there is no transition in the Data In signal for any of the circled timer intervals. Therefore, the decoder 120 determines that this is the default state of T0. The next two transitions in the Data In signal each correspond to signal T2 (FIG. 3E).

FIG. 3H depicts a data in signal input to the decoder 120 for one embodiment. This embodiment corresponds to the Option B embodiment for the transmitter 100 depicted in FIG. 2D. Recall that for Option B, the encoded data signal did transition if the data state corresponded to T0. The decoding may proceed by matching transitions in the Data In signal to the various timing signals T0-T3.

Figure 2:
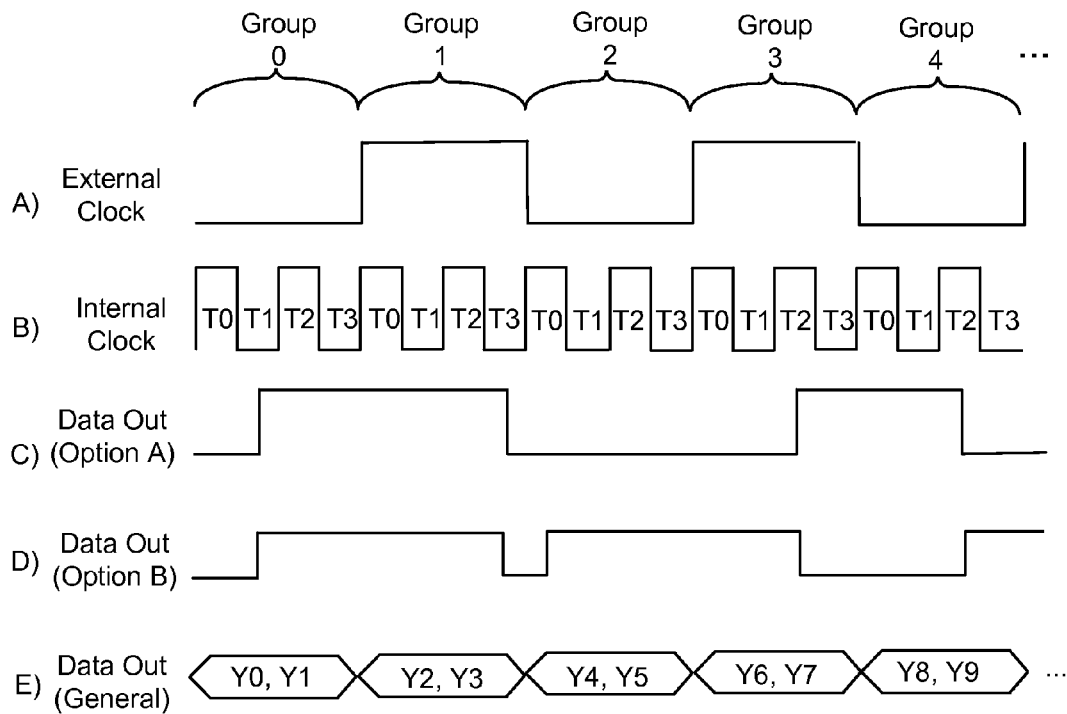
FIGS. 2A-2E depict embodiments of timing of clock and data signals for the transmitter of FIG. 1.

FIG. 4 is a diagram of one embodiment of a transmitter unit 402 that includes eight transmitters 100, each of which outputs an encoded data signal. The transmitter unit 402 inputs eight data lines, each of which is processed by one of the transmitters 100(0)-100(7). Each splitting unit 105 splits its input data signal into "n" lines. These "n" lines are input to the respective transmitter 100. In one embodiment, "n" is two. In this case, the transmitters 100(0)-100(7) may process a Bit 0 and a Bit 1, as depicted in FIGS. 1 and 2. However, "n" could be three, four, or more. Thus, a given transmitter 100 may process three bits, four bits, etc.

Figure 5:
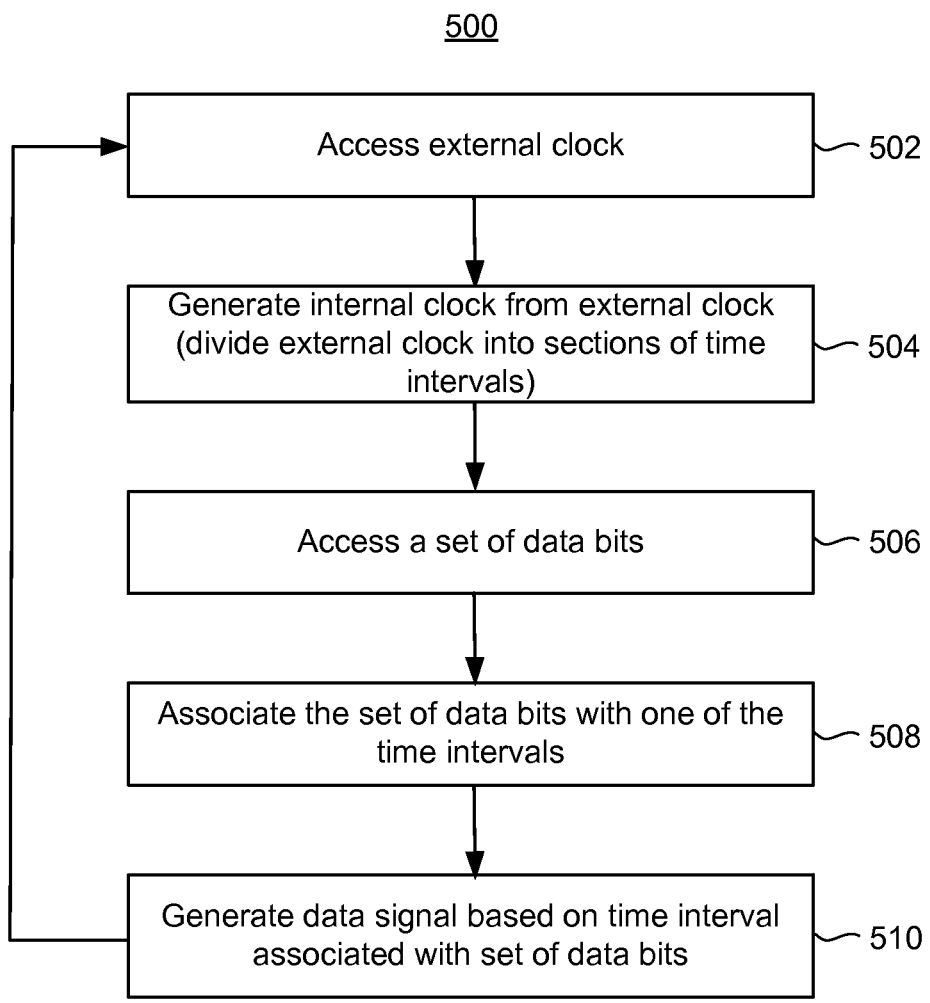
FIG. 5 is a flowchart of one embodiment of a process of transferring data.

FIG. 5 is a flowchart of one embodiment of a process 500 of transferring data. In one embodiment, process 500 is performed by the transmitter unit 402 of FIG. 4. However, process 500 is not so limited. In one embodiment, process 500 is performed by the transmitter 100 of FIG. 1. Recall that FIG. 1 is for an example of encoding two bits per half clock cycle. Process 500 could be used to encode more than two bits per half clock cycle. In one embodiment, process 500 is performed by the transmitter 100 of FIG. 16, which encodes three bits per half clock cycle. Also, process 500 could be used to encode the bits over some interval other than a half clock cycle. Further details are discussed below. FIGS. 1 and 2 may be referred to for the purpose of illustrating process 500. However, it will be understood that process 500 is not so limited.

Note that in process 500, the order in which the steps are described is for convenience of explanation. In step 502, an external clock is accessed. Referring to FIG. 1, the counter 115 accesses the external clock. Steps 504-510 refer to processing that may occur for one section of the external clock. In one embodiment, the section is one half clock cycle. This may be the case for processing depicted in FIG. 2A-2E. Recall that this corresponds to processing one group of data and encoding that group into the data signal. However, steps 504-510 could be for some other interval of the external clock. Examples of encoding the group of data bits over some other interval of the external clock are discussed below. For purpose of discussion the data bits that are encoded have a certain number of data states. For example, two bits may have four data states, three bits may have eight data states, etc. In general "n" data bits may have $2^n$ data states.

In step 504, an internal clock is generated from the external clock. Referring to FIG. 1, the counter 115 generated the internal clock from the external clock. Referring to FIGS. 2A and 2B, the internal clock is four times the frequency of the external clock. However, in another embodiment, the internal clock is eight times the frequency of the external clock. In one embodiment, the internal clock is sixteen times the frequency of the external clock. The frequency of the internal clock could be some other multiple of the frequency of the external clock.

Generating the internal clock divides the external clock signal into time intervals, in one embodiment. Referring to FIG. 2B, those time intervals are labeled T0-T3 for each half clock cycle. In one embodiment, there is a one-to-one association between the time intervals and the data states of the input data bits. For example, the four time intervals T0-T3 may have a one-to-one association with four data states of D0 and D1. In one embodiment, eight time intervals have a one-to-one association with eight data states of three input data bits. In one embodiment, sixteen time intervals have a one-to-one association with sixteen data states of four input data bits. In one embodiment, $2^n$ successive time intervals have a one-to-one association with $2^n$ data states of "n" input data bits (with "n" being an integer greater than one).

In step 506, a group of data bits are accessed. Referring to FIG. 1, Bit 0 and a Bit 1 are accessed. Referring to FIG. 4, one bit on each of the "n" lines that are input to a given transmitter 100 may be accessed. Thus, step 506 may access 2, 3, 4, or some other number of bits.

In step 508, the group of data bits are associated with one of the time intervals. This association may be based on a one-to-one association between $2^n$ time intervals have and $2^n$ data states of "n" input data bits. For example, referring to Table I, the two data bits may be associated with one of the intervals T0-T3.

In step 510, an encoded data signal (or simply "data signal") is generated based on the time interval associated with each group of data bits. Step 510 may include encoding the group of data bits in a portion of the data signal that corresponds to one section of the clock signal. For example, the portion of the Data Out signal in FIG. 2C that corresponds to Group 0 may be formed. Step 510 may include transitioning the Data Out signal at an appropriate point. Note that in one embodiment, the data signal is not transitioned if the data bits correspond to a default state. As one example, Option A that was discussed with respect to FIG. 2C has a default state. In one embodiment, the data signal transitions no more than once per group of data bits.

Figure 6:
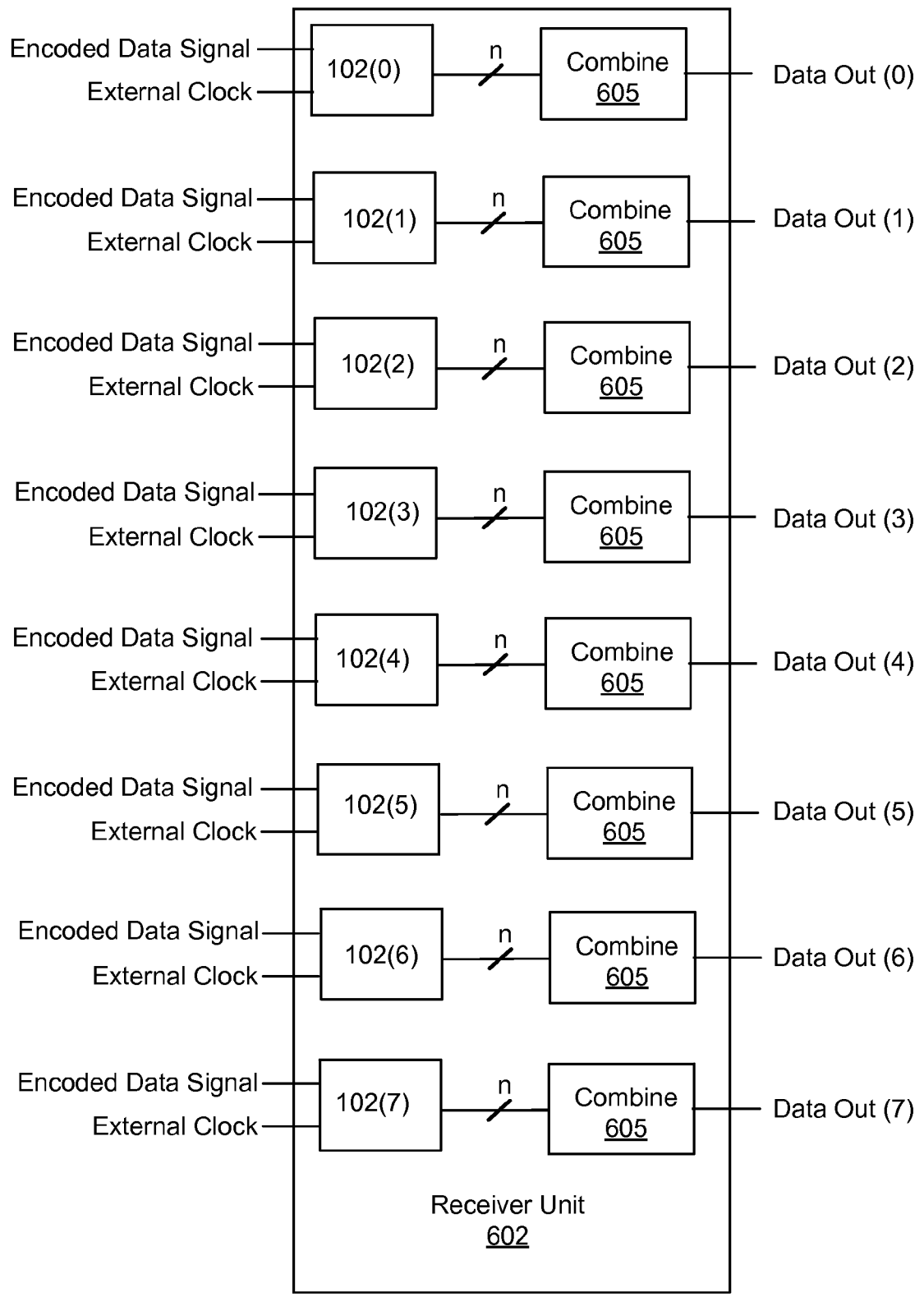
FIG. 6 is a diagram of one embodiment of a receiver unit that includes eight receivers, each of which inputs an encoded data signal.

FIG. 6 is a diagram of one embodiment of a receiver unit 602 that includes eight receivers 102, each of which inputs an encoded data signal. Each encoded data signal each is processed by one of the receivers 102(0)-102(7). Each receiver 102 outputs "n" lines, which the respective combine unit 605 combines to produce one of the Data Out lines. In one embodiment, "n" is two. In this case, the receivers 102(0)-102(7) may output a Bit 0 and a Bit 1, as depicted in FIG. 1. However, "n" could be three, four, or more. Thus, a given receiver may process three bits, four bits, etc.

Figure 3:
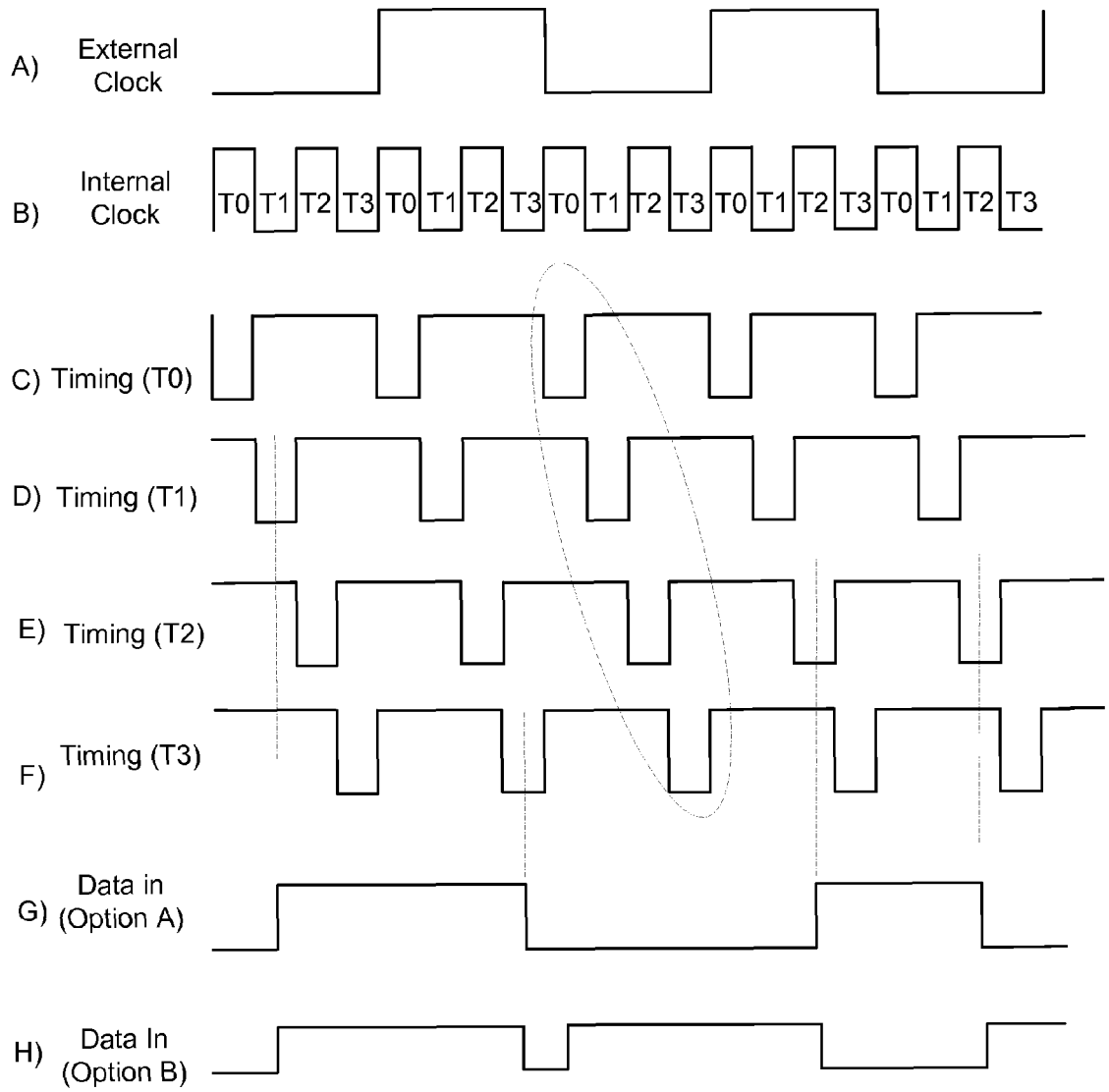
FIG. 3A-3H depict embodiments of timing of clock and data signals for the receiver of FIG. 1.
Figure 7:
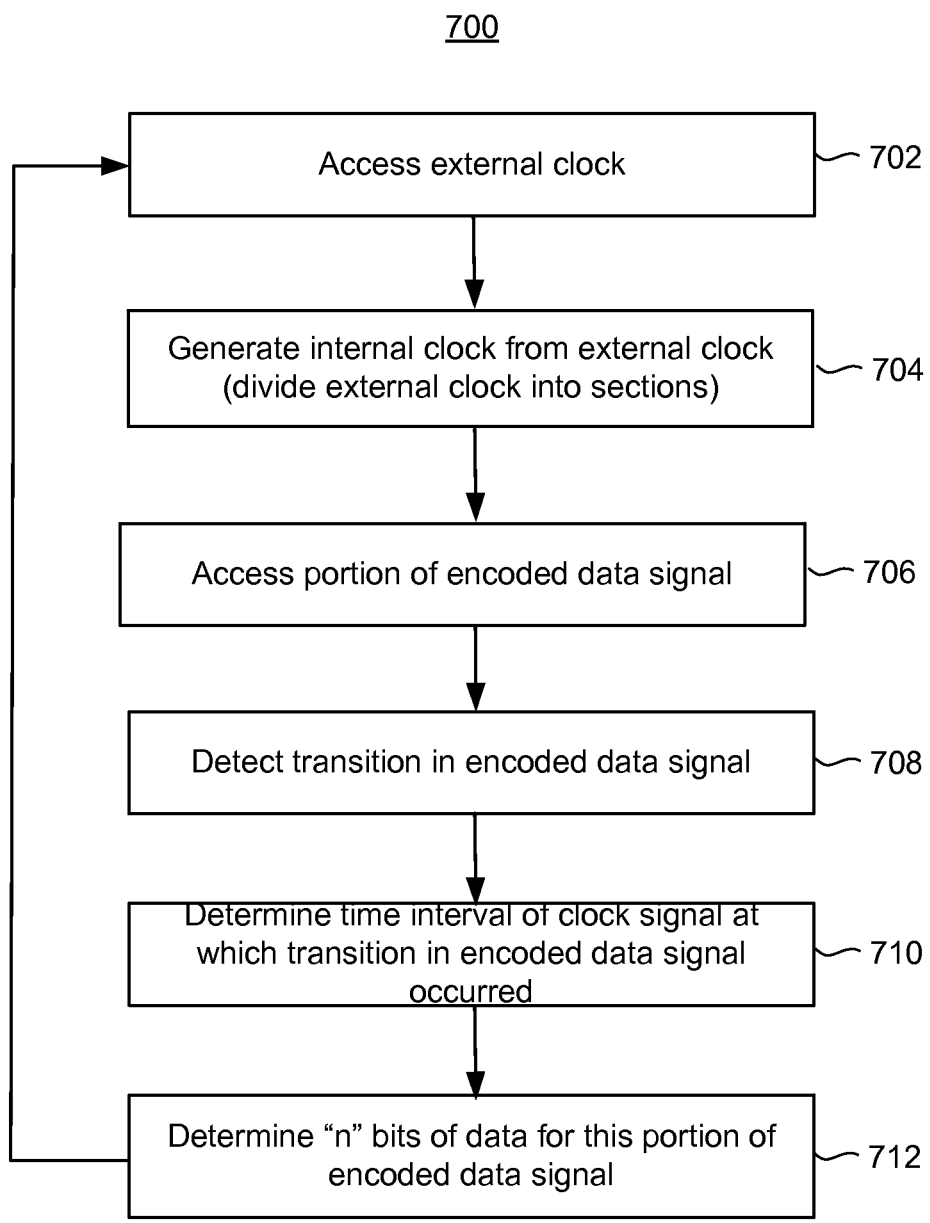
FIG. 7 is a flowchart of one embodiment of a process of decoding an encoded data signal.

FIG. 7 is a flowchart of one embodiment of a process 700 of decoding an encoded data signal. In one embodiment, process 700 is performed by the receiver unit 602 of FIG. 6. However, process 700 is not so limited. In one embodiment, process 700 is performed by the receiver 102 of FIG. 1. Recall that FIG. 1 is for an example of decoding a signal that was encoded with two bits per one half clock cycle. Process 700 could be used to decode a signal having more than two bits per half clock cycle. In one embodiment, the receiver 102 of FIG. 16 which decodes a data signal with three bits encoded per half clock cycle is used. Also, process 700 could be used to decode the bits over some interval other than a half clock cycle. Further details are discussed below. FIGS. 1 and 3 may be referred to for the purpose of illustrating process 700. However, it will be understood that process 700 is not so limited.

Note that in process 700, the order in which the steps are described is for convenience of explanation. In step 702, an external clock is accessed. Referring to FIG. 1 the counter 125 in the receiver 102 accesses the external clock, in one embodiment.

In step 704, an internal clock is generated from the external clock. Referring to FIGS. 1 and 3B, the counter generates the internal clock from the external clock. Generating the internal clock divides the external clock signal into time intervals, in one embodiment. Referring to FIG. 3B, those time intervals are labeled T0-T3 for each half clock cycle. In one embodiment, there is a one-to-one association between the time intervals and the data states of output data bits. In one embodiment, $2^n$ time intervals have a one-to-one association with $2^n$ data states of "n" output data bits.

In step 706, a portion of an encoded data signal is accessed. In one embodiment, this portion may correspond to one half of the clock cycle of the external clock. Note that the access of the encoded data signal may be an ongoing process. Step 708 processes this portion of the data signal. Note that step 706 could access a different portion of the encoded data signal.

In step 708, a transition in the accessed portion of the encoded data signal is detected. In step 710, a time interval of the internal clock signal at which the transition occurred is detected. One example of this was discussed with respect to FIGS. 3C-3G. As discussed, the first transition for the signal in FIG. 3G happens during interval T1.

In step 712, "n" data bits are determined for the portion of the encoded data signal. Step 712 may include mapping the time interval from step 710 to data bits. For example, interval T1 may be mapped to "10".

The process may then return to step 702 to access the external clock signal. Note that in one embodiment, a transition will not always be detected during step 708. In one embodiment, if the portion of the encoded data signal being processed does not have a transition, then this means that the state is a default state. However, note that for at least some of the iterations of process 700, a transition should be detected in step 708.

Figure 8B:
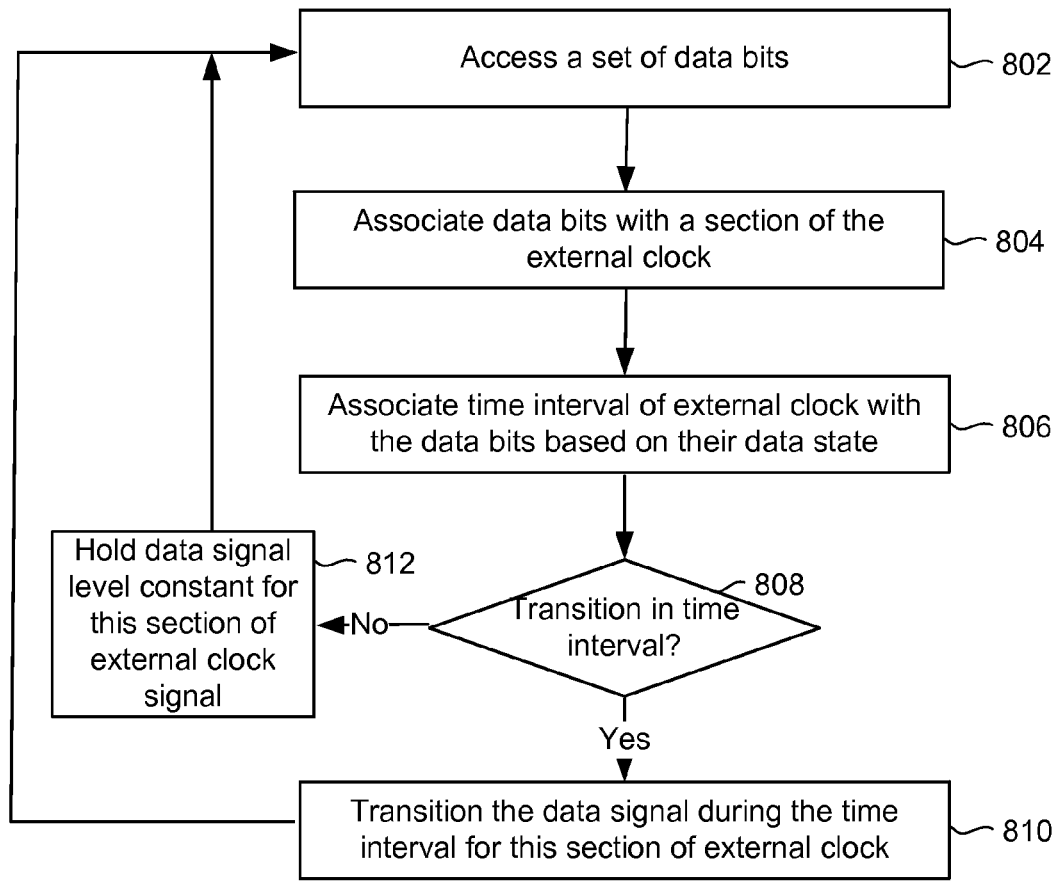
FIG. 8B is a flowchart of one embodiment of a process of generating an encoded data signal.
Figure 8A:
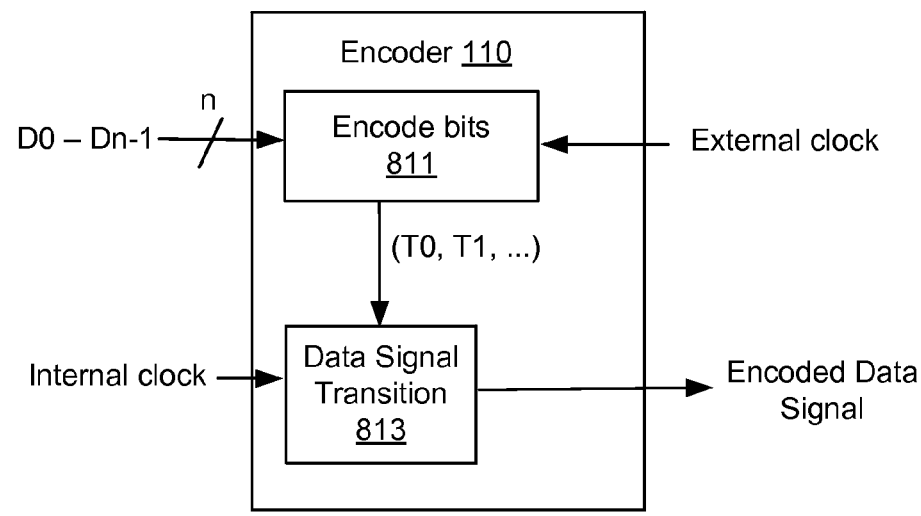
FIG. 8A is a block diagram of one embodiment of an encoder.

FIG. 8A is a block diagram of one embodiment of an encoder 110. The encoder 110 inputs data bits D0 to Dn−1 on "n" data lines. The encoder 110 may be used in one embodiment of the transmitter unit 402 of FIG. 4. The input data bits are encoded to a time interval by the encode bits module 811. In one embodiment, there are $2^n$ time intervals. For example, there are time intervals T0-T3 for the example in which there are two input data bits in FIG. 2. The data signal transition module 813 inputs an internal clock and the time interval from module 811. The data signal transition module 813 outputs an encoded data signal.

The internal and external clock referred to in FIG. 8A may be similar to the example of FIG. 1 in which the internal clock is derived from the external clock. As discussed above, the internal clock could have a frequency that is some multiple of the external clock.

FIG. 8B is a flowchart of one embodiment of a process of generating an encoded data signal. The process may be used by the encoder 110 of FIG. 8A. In the process of FIG. 8B, there is a default state for which the encoded data signal does not transition. One example of this is depicted in FIG. 2C. In step 802, a group of data bits are accessed. For example, the encode bits 811 module accesses a bit on each of its "n" input data lines.

In step 804, the data bits are associated with a section of an external clock. The encode bits module 811 may input the external clock for timing of when to access the input data bits and to output the time intervals. In the example of FIG. 2, the input data bits are associated with a certain half cycle of the external clock. Thus, the section may be a specific half cycle of the external clock. However, the section could be some portion other than a half clock cycle.

In step 806, a time interval of the external clock is associated with the data bits based on their data state. For example, by assigning one of the time intervals T0-T3 to the input data bits, the data bits may be associated with some time interval of the external clock. Referring to FIGS. 2A and 2B, if the internal clock is synchronized with the external clock, then each of the time periods (T0-T3) in the internal clock corresponds to a certain portion of the external clock.

In step 808, a determination is made as to whether the encoded data signal should transition for this group of data bits. If the data bits correspond to a default time period then the data signal does not transition, in one embodiment. For example, if the data bits correspond to time interval T0, then the data signal should not transition. However, if the data bits correspond to any of time intervals T1-T3, then the data signal should transition. The default time interval is not required to be the first time interval. Step 808 may be determined by the data signal transition module 813.

If the data signal is to transition, then the data signal transition module transitions the encoded data signal in step 810. The transition occurs during the relevant time interval (e.g., T1, T2, . . . ). Also, the transition occurs during the section of the external clock for which the data bits pertain. Then, the process returns to step 802 to access another group of input data bits. In one embodiment, the transition is either a low to high or a high to low transition, depending on the present state of the encoded data signal.

If the data signal is not to transition, then the data signal transition module 813 outputs an encoded data signal in step 812 that does not transition during the section of the external clock for which the data bits pertain. Then, the process returns to step 802 to access another group of input data bits.

Figure 8C:
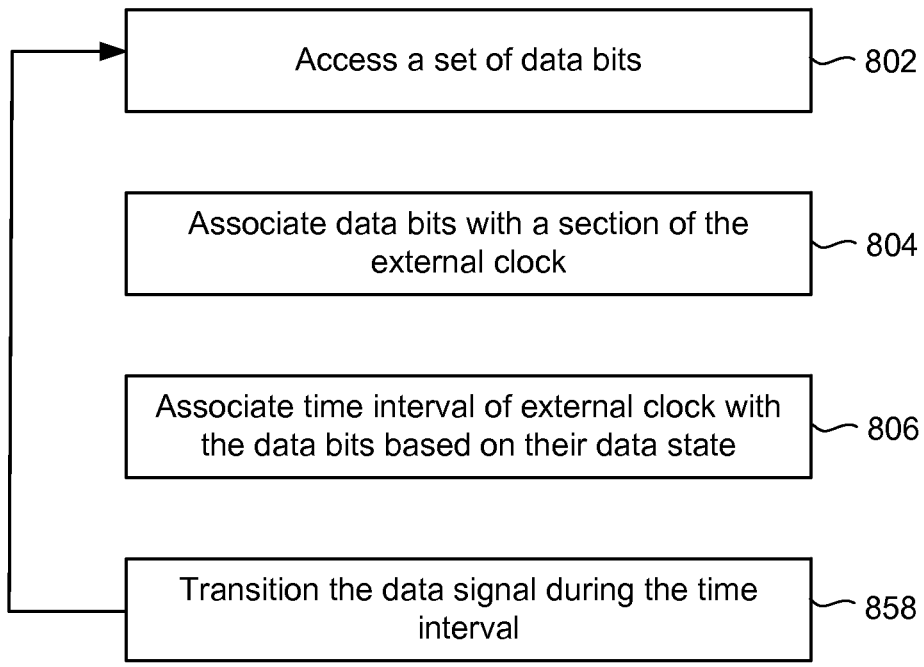
FIG. 8C is a flowchart of one embodiment of a process of generating an encoded data signal without a default state for which the encoded data signal does not transition.

In one embodiment, there is not a default state for which the encoded data signal does not transition. FIG. 8C is a flowchart of one embodiment of a process of generating an encoded data signal without a default state for which the encoded data signal does not transition. One example of this is depicted in FIG. 2D. The process may be used by the encoder 110 of FIG. 8A.

Steps 802, 804, and 806 may be similar to those in the process of FIG. 8B. In step 858, the encoded data signal is transitioned during the time interval that corresponds to the data state of the input data bits. The process then repeats.

Figure 9C:
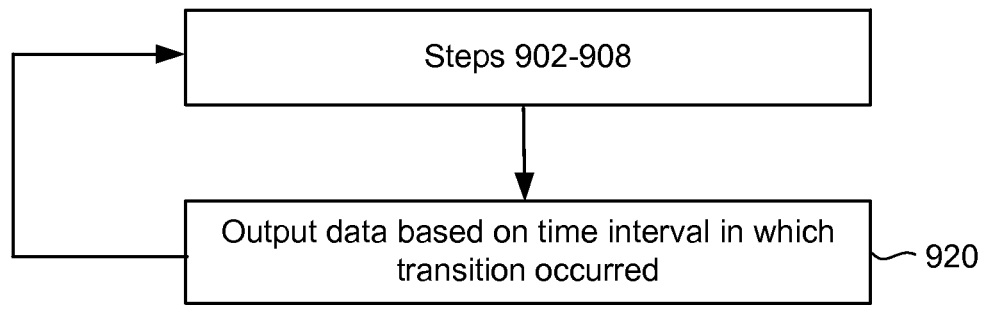
FIG. 9C is a flowchart of one embodiment of a process of generating an encoded data signal without a default state for which the encoded data signal does not transition.
Figure 9B:
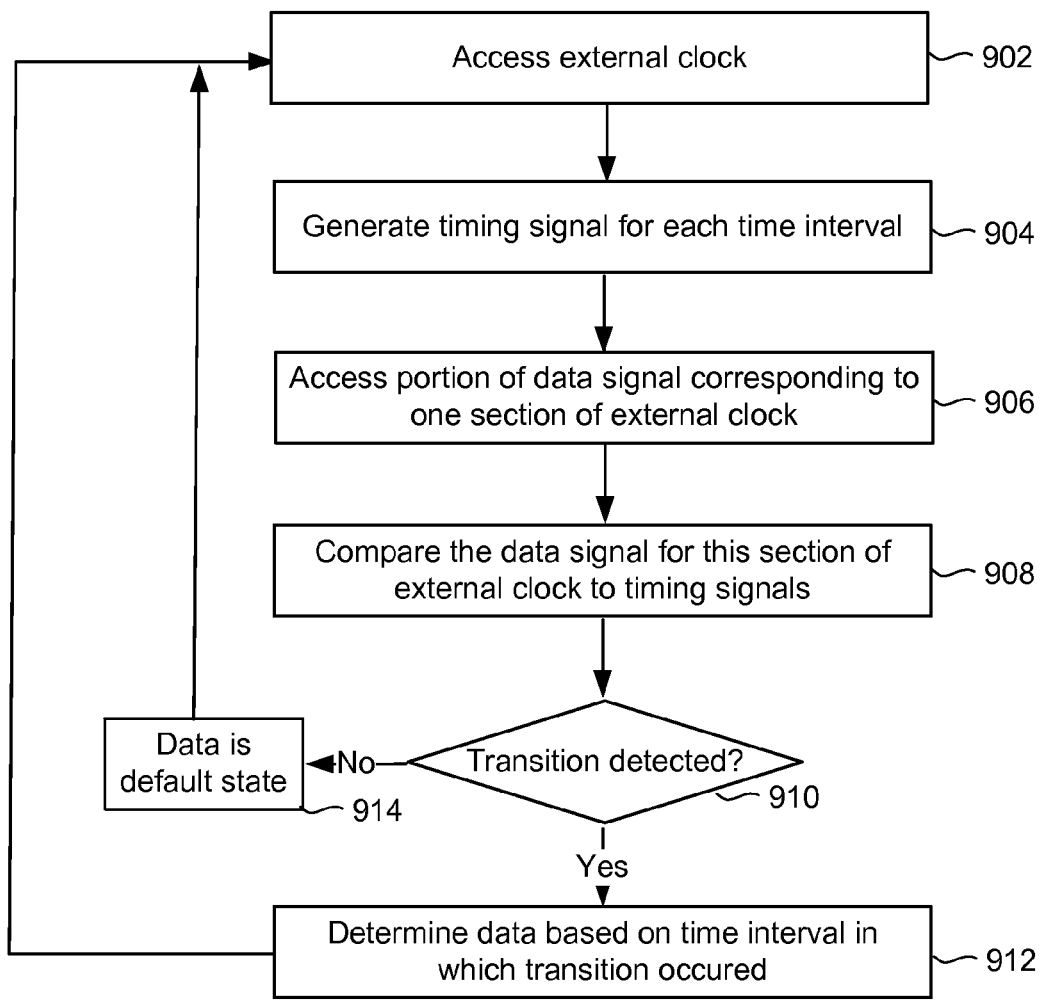
FIG. 9B is a flowchart of one embodiment of a process of decoding an encoded data signal.
Figure 9A:
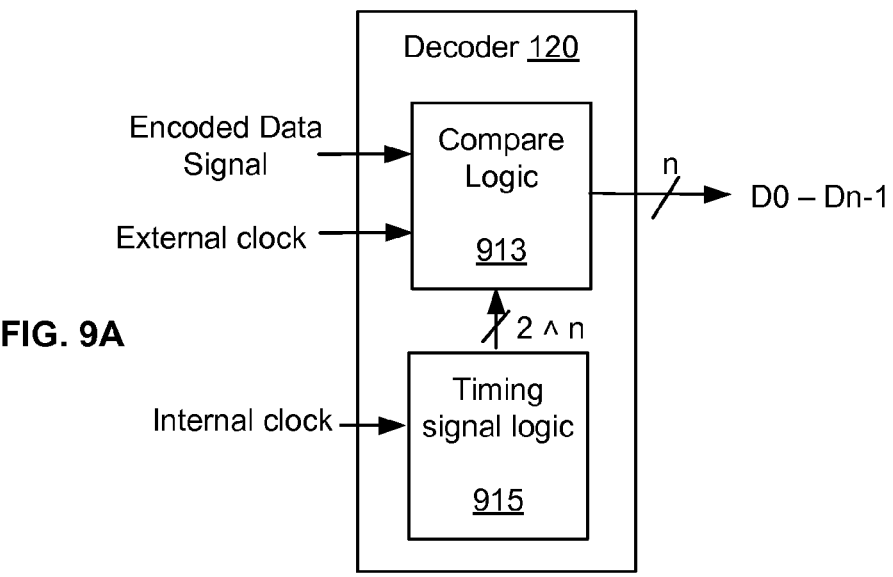
FIG. 9A is a block diagram of one embodiment of a decoder.

FIG. 9A is a block diagram of one embodiment of a decoder 120. The decoder 120 may be used in one embodiment of the receiving receiver unit 602 of FIG. 6. The timing signal logic 915 inputs an internal clock and outputs $2^n$ timing signals. For example, referring to FIG. 3C-3F, signals Timing (T0)-Timing (T3) are generated from the internal clock. The compare logic 913 inputs an encoded data signal, which may be provided by a transmitter 100. The compare logic 913 also inputs an external clock and the timing signals. The compare logic 913 outputs data bits D0 to Dn-1 on "n" data lines. The internal and external clock referred to in FIG. 9A may be similar to the example of FIG. 1 in which the internal clock is derived from the external clock. As discussed above, the internal clock could have a frequency that is some multiple of the external clock.

FIG. 9B is a flowchart of one embodiment of a process of decoding an encoded data signal. The process may be used by the decoder 120 of FIG. 9A. In the process of FIG. 9B, there is a default state for which the encoded data signal does not transition. One example of this is depicted in FIG. 2D. In step 902, an external clock is accessed. In one embodiment, an internal clock is generated from the external clock.

In step 904, a timing signal is generated for each of several time intervals. For example, the timing signal logic 915 inputs the internal clock and outputs $2^n$ timing signals (e.g., FIG. 3C-3F).

In step 906, a portion of the encoded data signal that corresponds to one section of the external clock is accessed. For example, the section could be one half clock cycle of the external clock.

In step 908, the portion of the encoded data signal is compared to the timing signals. In one embodiment, step 908 detects transitions in the encoded data signal. FIG. 3C-3G depict one example of this. The transition could be a low to high transition or a high to low transition, in one embodiment.

Note that there might not be a transition for this portion of the encoded data signal. Step 910 determines whether there is a signal transition for this portion of the encoded data signal. If not, it is determined that this is the default data state, in step 914. Otherwise, the data state is determined based on the time interval in which the transition occurred, in step 912. The process then returns to step 902, where access of the external clock is continued.

In one embodiment, there is not a default state for which the encoded data signal does not transition. FIG. 9C is a flowchart of one embodiment of a process of generating an encoded data signal without a default state for which the encoded data signal does not transition. One example of this is depicted in FIG. 2D. The process may be used by the decoder 120 of FIG. 9A. The process begins by performing steps 902-908 from the process of FIG. 9B. After step 908, the time interval in which the transition occurred should be known. In step 920, data is output based on the time interval in which the transition occurred. The process then repeats.

As noted above, the input data bits could be associated with a portion of the external clock other than a half clock cycle. FIGS. 10A-10E depict timing diagrams of one embodiment in which the portion of the external signal is one full clock cycle. In other words, the encoding of each group of data bits may occur in a portion of the encoded data signal that corresponds to one full cycle of the external clock. These timing diagrams may be used in connection with one embodiment of the transmitter unit 402 of FIG. 4.

Figure 10:
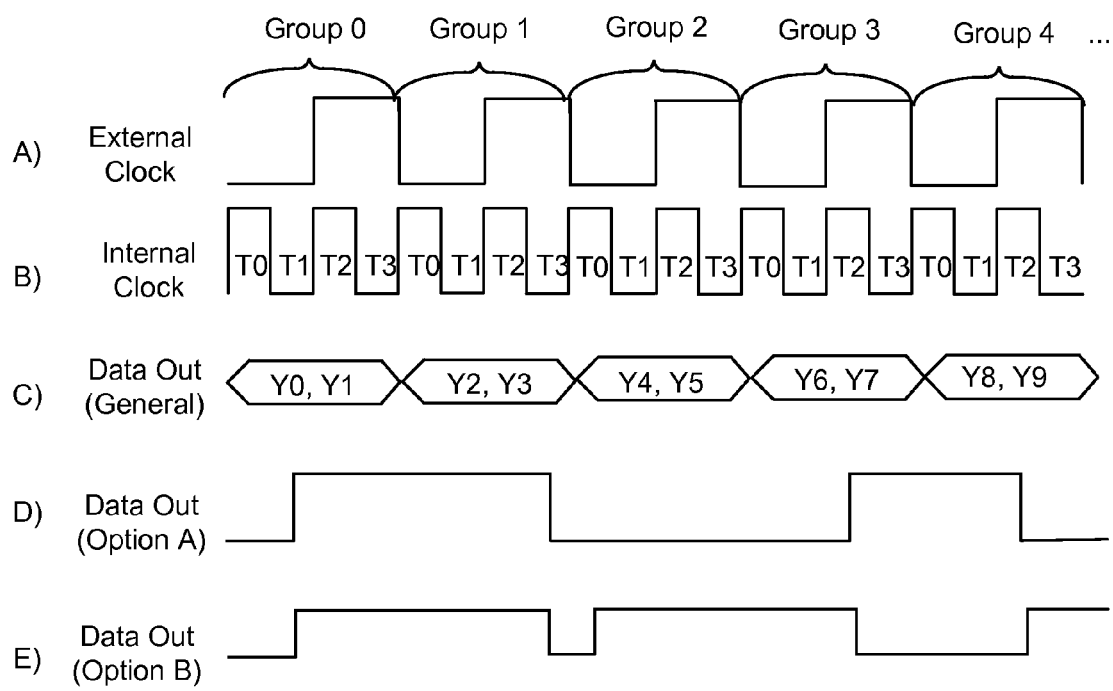
FIGS. 10A-10E depict timing diagrams of one embodiment in which the portion of the external signal is one full clock cycle.

FIG. 10A depicts an example of the external clock. The labels Group 0, Group 1, etc. are shown in association with the external clock signal. Each Group corresponds to one full cycle of the external clock, in one embodiment. Each group may correspond to some group of data that is to be encoded into a data signal. For example, each group may correspond to a pair of input bits Bit 0, Bit 1. Thus, each half clock cycle there will be a new group. In one embodiment, the duty cycle of the external clock is 50%.

FIG. 10B depicts an internal clock signal that may be generated from the external clock. In this example, the internal clock signal is divided into four intervals for each full clock cycle. Stated another way, the internal clock signal is divided into four intervals for each group. The four intervals are labeled as T0, T1, T2, and T3. Each of these intervals may correspond to one data state. In other embodiments, the number of intervals may be other then four. For example, there might be eight or 16 intervals.

FIG. 10C depicts a general format for a data out signal. The data out signal transmits Y0, Y1 during the first external clock cycle (Group 0), Y2, Y3 during the second external clock cycle (Group 1), Y4, Y5 during the third external clock cycle (Group 2), etc. Thus, two bits are encoded into the data signal for each full cycle of the external clock.

FIG. 10D depicts an example data out signal output for one embodiment. In this embodiment, the data signal does not transition during T0 in the event that the data is "00." Thus, T0 may be a default state. This is similar to as Option A depicted in FIG. 2C, as is therefore labeled as Option A.

FIG. 10E depicts an example data out signal output for one embodiment in which there is not a default state. For example, the data signal does transition during T0 in the event that the data is "00". This is similar to as Option B depicted in FIG. 2D, as is therefore labeled as Option B.

FIG. 11A-11G depict one embodiment of timing of clock and data signals for the receiver 102. These signals are for an embodiment in which there is a default state for which the encoded data signal does not transition. These timing signals may be used in connection with one embodiment of the receiver unit 602 of FIG. 6.

Figure 11:
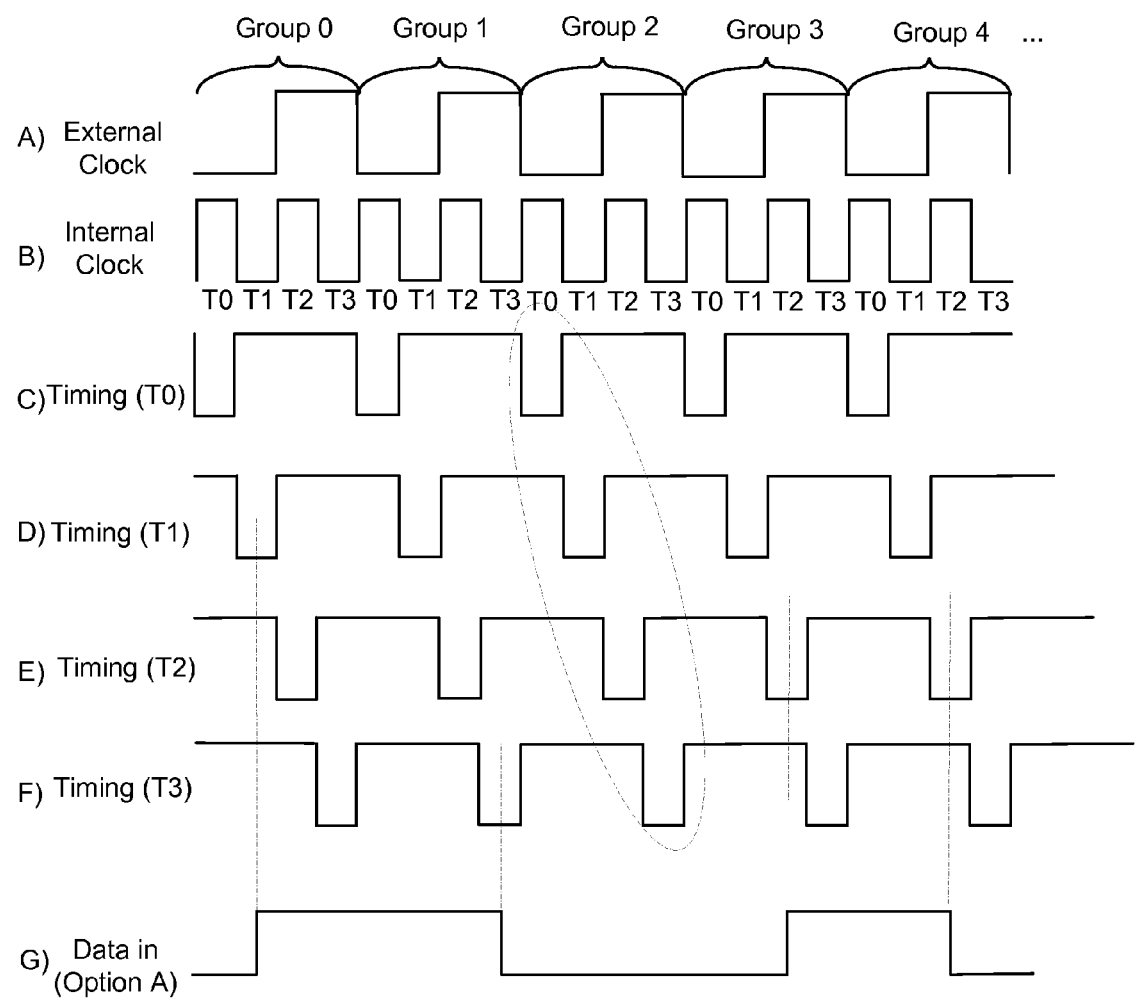
FIG. 11A-11G depict one embodiment of timing of clock and data signals for the receiver with a default state.

FIG. 11A shows the external clock, which may be synchronized with the external clock that is in the transmitter 100. FIG. 11B depicts an internal clock signal that may be generated from the external clock. This internal clock may resemble the internal clock that is generated by the transmitter 100. As can be seen, the receiver's internal clock signal has twice the frequency of the external clock.

FIGS. 11C-11F are four timing signals referred to as Timing (T0) to Timing (T3), respectively. Each of these timing signals is low for one of the time intervals of the internal clock, and high for the other three time intervals. For example, T0 is low for time period T0, and high for time intervals T1, T2 and T3. The signals T0-T3 could be inverted such that they are high during one time interval and low for the other three. The signals T0-T3 are used to decode the data signal in one embodiment.

FIG. 11G depicts a data input signal input to the decoder 120 for one embodiment. This embodiment corresponds to the Option A embodiment depicted in FIG. 10D. Recall that for Option A, the data signal did not transition if the data state corresponded to T0. Dashed lines are shown between the transitions in the Data In signal of FIG. 11G and various ones of the timing signals Timing (T0) to Timing (T3). In one embodiment, the decoder 120 matches the transitions in the Data In signal to the various timing signals Timing (T0) to Timing (T3) to determine which time interval the transition occurred in. Thus, the data may be decoded. For example, the first transition corresponds to signal Timing (T1) (FIG. 11D) and the second transition corresponds to signal Timing (T3) (FIG. 11F). Note that there is no transition in the Data In signal for any of the circled timing signals. Therefore, the decoder 120 determines that this is the default state of T0. The next two transitions in the Data In signal each correspond to signal Timing (T2) (FIG. 11E).

FIG. 12A-12G depict one embodiment of timing of clock and data signals for the receiver 102. These signals are for an embodiment in which there is not a default state for which the encoded data signal does not transition. These timing signals may be used in connection with one embodiment of the receiver unit 602 of FIG. 6.

Figure 12:
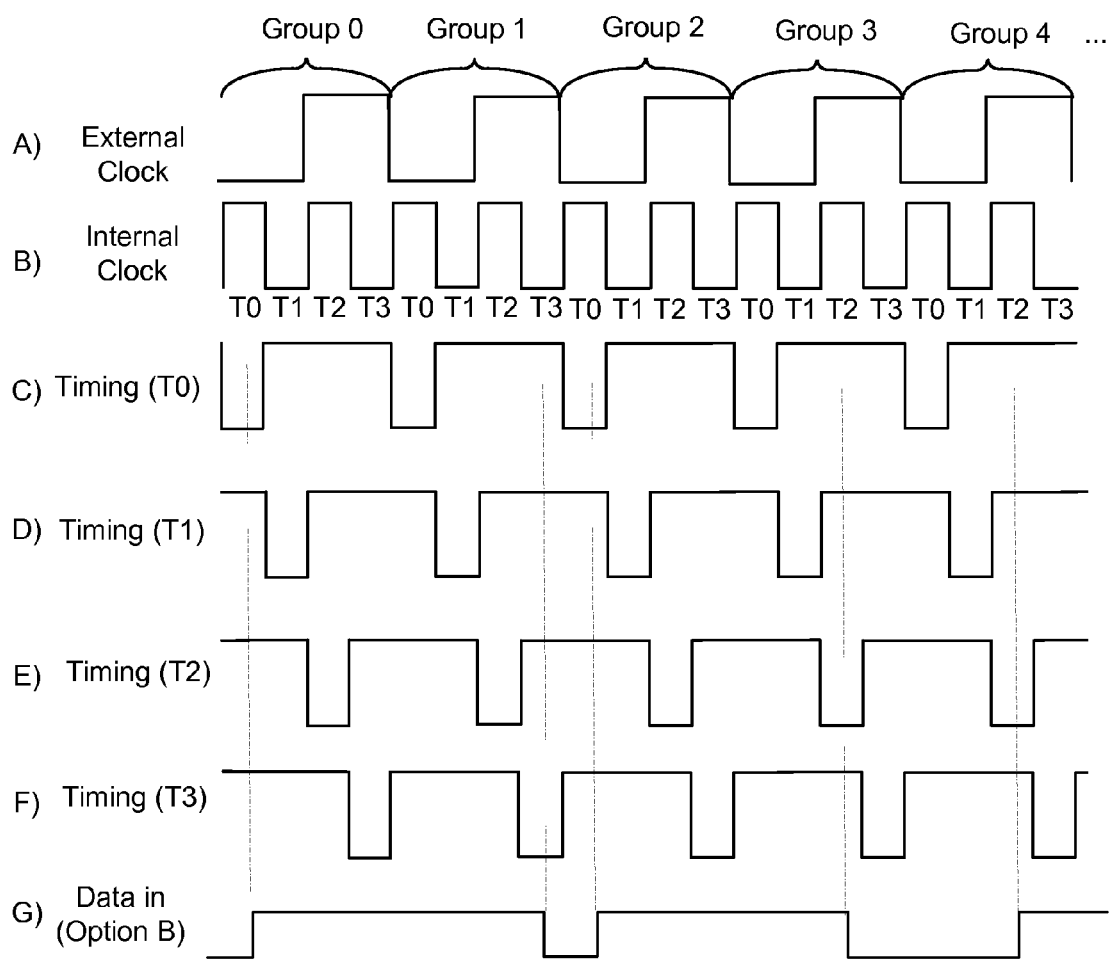
FIG. 12A-12G depict one embodiment of timing of clock and data signals for the receiver without a default state.

FIG. 12A shows the external clock, which may be synchronized with the external clock that is in the transmitter 100. FIG. 12B depicts an internal clock signal that may be generated from the external clock. This internal clock may resemble the internal clock that is generated by the transmitter 100. As can be seen, the receiver's internal clock signal has twice the frequency of the external clock.

FIGS. 12C-12F are four timing signals referred to as Timing (T0) to Timing (T3), respectively. Each of these timing signals is low for one of the time intervals of the internal clock, and high for the other three time intervals. For example, T0 is low for time period T0, and high for time intervals T1, T2 and T3. The signals T0-T3 could be inverted such that they are high during one time interval and low for the other three. The signals T0-T3 are used to decode the data signal in one embodiment.

FIG. 12G depicts a data input signal input to the decoder 120 for one embodiment. This embodiment corresponds to the Option B embodiment depicted in FIG. 10E. Recall that for Option B, the data signal does transition if the data state corresponded to T0. It also transitions for the other data states. Dashed lines are shown between the transitions in the Data In signal of FIG. 12G and various ones of the timing signals Timing (T0) to Timing (T3). In one embodiment, the decoder 120 matches the transitions in the Data In signal to the various timing signals Timing (T0) to Timing (T3) to determine which time interval the transition occurred in. Thus, the data may be decoded. For example, the first transition corresponds to signal Timing (T0) (FIG. 12C) and the second transition corresponds to signal Timing (T3) (FIG. 12F). The last two transitions in the Data In signal each correspond to signal Timing (T2) (FIG. 12E).

As noted above, the input data bits could be associated with a portion of the external clock other than a half clock cycle. FIGS. 13A-13D depict timing diagrams of one embodiment in which the portion of the external signal is two full external clock cycles. In other words, the encoding of each group of data bits may occur in a portion of the encoded data signal that corresponds to two full cycles of the external clock. These timing signals may be used in connection with one embodiment of the transmitter unit 402 of FIG. 4.

Figure 13:
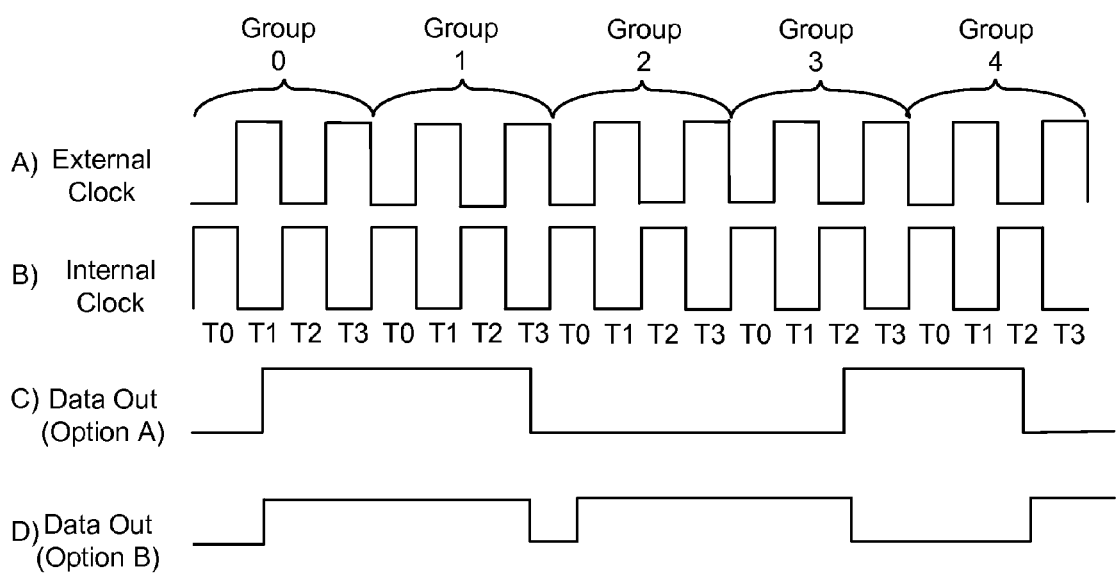
FIGS. 13A-13D depict timing diagrams of embodiments in which the portion of the external signal is two full external clock cycles.

FIG. 13A depicts an example of the external clock. The labels Group 0, Group 1, etc. are shown in association with the external clock signal. Each Group corresponds to two full cycles of the external clock. Each group may correspond to some group of data that is to be encoded into a data signal. For example, each group may correspond to a pair of input bits Bit 0, Bit 1. Thus, each half clock cycle there will be a new group. In one embodiment, the duty cycle of the external clock is 50%.

FIG. 13B depicts an internal clock signal that may be generated from the external clock. In this example, the internal clock signal is divided into four intervals for each full clock cycle. Stated another way, the internal clock signal is divided into four intervals for each group. The four intervals are labeled as T0, T1, T2, and T3. Each of these intervals may correspond to one data state. In other embodiments, the number of intervals may be other then four. For example, there might be eight or 16 intervals.

FIG. 13C depicts an example data out signal output for one embodiment. In this embodiment, the data signal does not transition during T0 in the event that the data is "00." Thus, T0 may be a default state. This is similar to as Option A depicted in FIG. 2C, as is therefore labeled as Option A.

FIG. 13D depicts an example data out signal output for one embodiment in which there is not a default state. For example, the data signal does transition during T0 in the event that the data is "00". This is similar to as Option B depicted in FIG. 2D, as is therefore labeled as Option B.

FIG. 14A-14G depict one embodiment of timing of clock and data signals for the receiver 102. These signals are for an embodiment in which there is a default state for which the encoded data signal does not transition. These Figures correspond to one embodiment of FIGS. 13A-13C. These timing signals may be used in connection with one embodiment of the receiver unit 602 of FIG. 6.

Figure 14:
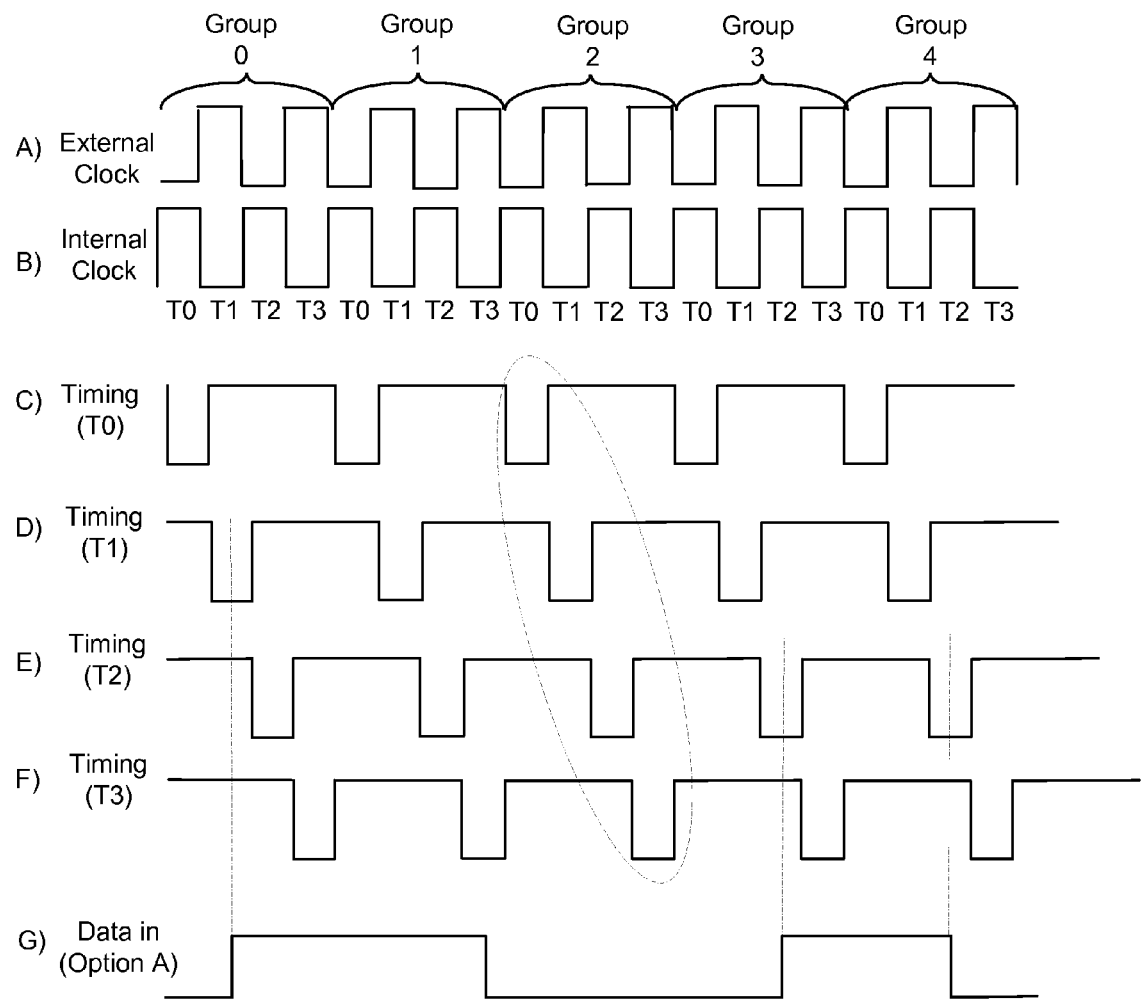
FIG. 14A-14G depict one embodiment of timing of clock and data signals for the receiver corresponding to the embodiment of FIGS. 13A-13C.

FIG. 14A shows the external clock, which may be synchronized with the external clock that is in the transmitter 100. FIG. 14B depicts an internal clock signal that may be generated from the external clock. This internal clock may resemble the internal clock that is generated by the transmitter 100. As can be seen, the receiver's internal clock signal has twice the frequency of the external clock.

FIGS. 14C-14F are four timing signals referred to as Timing (T0) to Timing (T3), respectively. Each of these timing signals is low for one of the time intervals of the internal clock, and high for the other three time intervals. For example, T0 is low for time period T0, and high for time intervals T1, T2 and T3. The signals T0-T3 could be inverted such that they are high during one time interval and low for the other three. The signals T0-T3 are used to decode the data signal in one embodiment.

FIG. 14G depicts a data input signal input to the decoder 120 for one embodiment. This embodiment corresponds to the Option A embodiment depicted in FIG. 13C. Recall that for Option A, the data signal did not transition if the data state corresponded to T0. Dashed lines are shown between the transitions in the Data In signal of FIG. 14G and various ones of the timing signals Timing (T0) to Timing (T3). In one embodiment, the decoder 120 matches the transitions in the Data In signal to the various timing signals Timing (T0) to Timing (T3) to determine which time interval the transition occurred in. Thus, the data may be decoded. For example, the first transition corresponds to signal Timing (T1) (FIG. 14D) and the second transition corresponds to signal Timing (T3) (FIG. 11F). Note that there is no transition in the Data In signal for any of the circled timing signals. Therefore, the decoder 120 determines that this is the default state of T0. The next two transitions in the Data In signal each correspond to signal Timing (T2) (FIG. 14E).

FIG. 15A-15G depict one embodiment of timing of clock and data signals for the receiver 102. These signals are for an embodiment in which there is not a default state for which the encoded data signal does not transition. These Figures correspond to the embodiment of FIGS. 13A, 13B, and 13D. These timing signals may be used in connection with one embodiment of the receiver unit 602 of FIG. 6.

Figure 15:
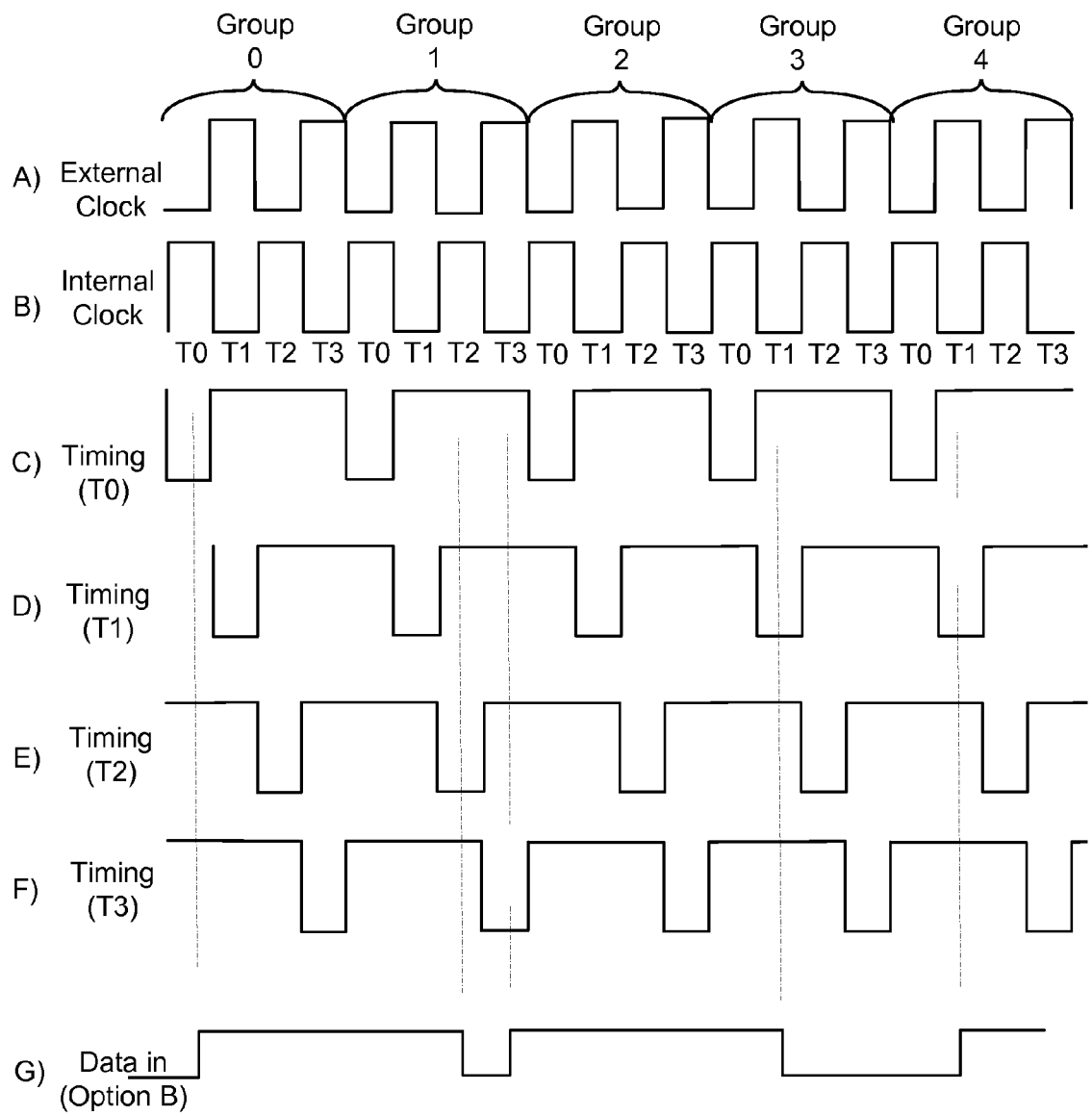
FIG. 15A-15G depict one embodiment of timing of clock and data signals for the receiver 102 corresponding to the embodiment of FIGS. 13A, 13B, and 13D.

FIG. 15A shows the external clock, which may be synchronized with the external clock that is in the transmitter 100. FIG. 15B depicts an internal clock signal that may be generated from the external clock. This internal clock may resemble the internal clock that is generated by the transmitter 100. As can be seen, the receiver's internal clock signal has twice the frequency of the external clock.

FIGS. 15C-15F are four timing signals referred to as Timing (T0) to Timing (T3), respectively. Each of these timing signals is low for one of the time intervals of the internal clock, and high for the other three time intervals. For example, T0 is low for time period T0, and high for time intervals T1, T2 and T3. The signals T0-T3 could be inverted such that they are high during one time interval and low for the other three. The signals T0-T3 are used to decode the data signal in one embodiment.

FIG. 15G depicts a data input signal input to the decoder 120 for one embodiment. This embodiment corresponds to the Option B embodiment depicted in FIG. 13D. Recall that for Option B, the data signal does transition if the data state corresponded to T0. It also transitions for the other data states. Dashed lines are shown between the transitions in the Data In signal of FIG. 15G and various ones of the timing signals Timing (T0) to Timing (T3). In one embodiment, the decoder 120 matches the transitions in the Data In signal to the various timing signals Timing (T0) to Timing (T3) to determine which time interval the transition occurred in. Thus, the data may be decoded. For example, the first transition corresponds to signal Timing (T0) (FIG. 15C) and the second transition corresponds to signal Timing (T3) (FIG. 15F). The last two transitions in the Data In signal each correspond to signal Timing (T2) (FIG. 15D).

Figure 16:
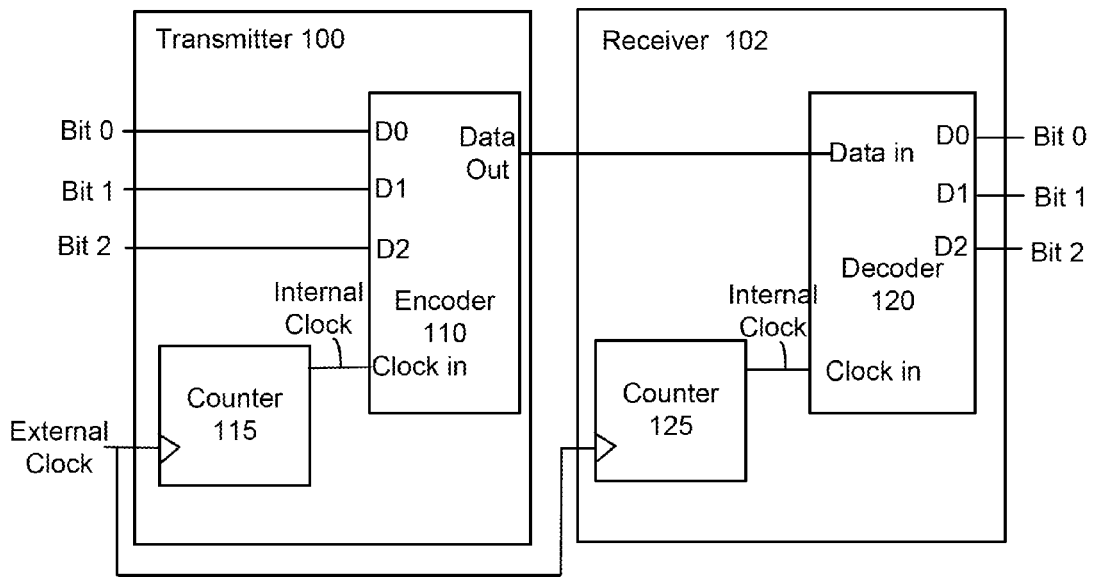
FIG. 16 depicts one embodiment of a transmitter and receiver that encode and decode three bits per section of external clock.

FIGS. 1-3 described embodiments in which two bits are encoded in the data signal for each section of the external clock. As noted, three or more bits could be encoded for each section. FIG. 16 depicts one embodiment of a transmitter 100 and receiver 102 that encode and decode three bits per section of external clock. In this embodiment, the encoder 110 inputs three bits and encodes those three bits into a data signal for a section of the external clock. The transmitter 100 of FIG. 16 is used in one embodiment of the transmitter unit 402 of FIG. 4. The receiver 102 of FIG. 16 is used in one embodiment of the receiver unit 602 of FIG. 6.

Figure 17:
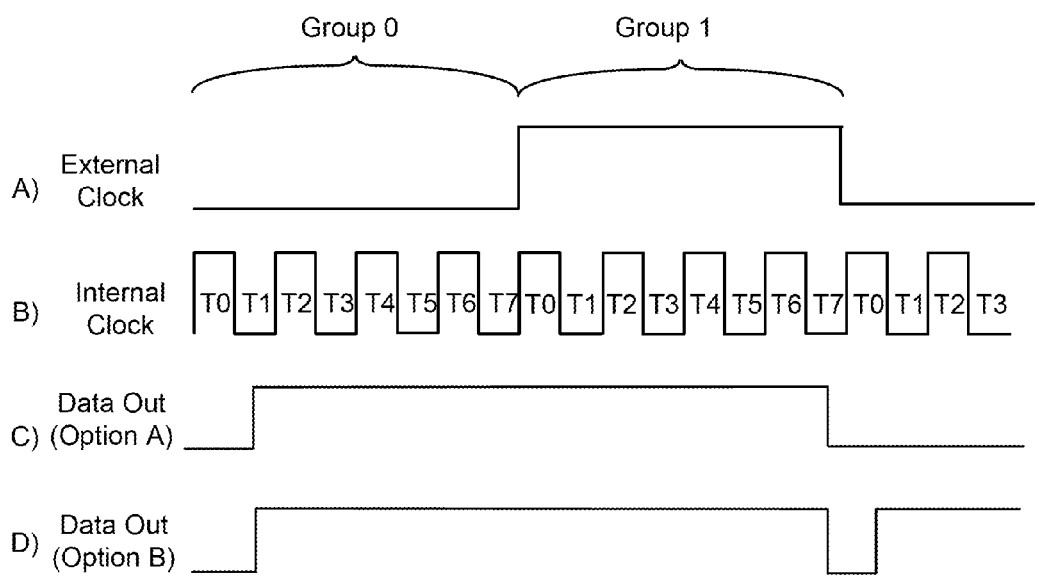
FIG. 17A-17D depict timing signals for embodiments of encoding three bits in the data signal for each section of the external clock.

FIG. 17A-17D depict timing signals for embodiments of encoding three bits in the data signal for each section of the external clock. These timing signals are for one embodiment of the transmitter 100 of FIG. 16. FIG. 17A depicts the external clock signal, which may be input to the counter 115 of the transmitter 100 of FIG. 16. The labels Group 0, Group 1, etc. are shown in association with the external clock signal. Each Group corresponds to one half of the external clock cycle. Each group may correspond to some group of data that is to be encoded into a data signal. For example, each group may correspond to three bits: Bit 0, Bit 1, and Bit 2. Thus, each half clock cycle there will be a new group. In one embodiment, the duty cycle of the external clock is 50%. The three bits could be encoded in the data signal corresponding to some other section of the external clock. For example, the section could be a full external clock cycle, two external clock cycles, etc.

FIG. 17B depicts an internal clock signal that may be generated by the counter 115 from the external clock cycle. In this example, the internal clock signal is divided into eight intervals for each half clock cycle. Stated another way, the internal clock signal is divided into eight intervals for each group of input bits. The eight intervals are labeled as T0-T7. Each of these intervals may correspond to one data state.

One example mapping of time interval to data states is shown in Table IV. Many other mappings are possible.

TABLE IV

| D0 | D1 | D2 | Time |
|---|---|---|---|
| 0 | 0 | 0 | T0 |
| 0 | 0 | 1 | T1 |
| 0 | 1 | 0 | T2 |
| 0 | 1 | 1 | T3 |
| 1 | 1 | 1 | T4 |
| 1 | 0 | 1 | T5 |
| 1 | 0 | 0 | T6 |
| 1 | 1 | 0 | T7 |

FIG. 17C depicts an example data out signal output by the encoder 110 for one embodiment. This is referred to as Option A. In this embodiment, the data signal does not transition during T0 in the event that the data is "00." Thus, T0 may be a default state.

FIG. 17D depicts an example data out signal output by the encoder 110 for one embodiment. This is referred to as Option B. In this embodiment, the data signal does transition during T0 in the event that the data is "00."

The receiver 102 for an embodiment in which the data signal has three bits encoded per section of the external clock may generate eight timing signals. Detection of transitions of the encoded data signal may be similar for two bit embodiments in which four timing signals are generated.

One embodiment disclosed herein includes a method comprising accessing a plurality of groups of data bits. Each group of data bits has one of plurality of data states. Each group includes at least two data bits. Sections in a clock signal that each includes a plurality of time intervals are determined. There is a one-to-one association between the plurality of data states and the time intervals. Each group of data bits are associated with one of the plurality of time intervals based on the one-to-one association between the plurality of data states and the time intervals. A data signal is generated based on the time interval associated with each group of data bits. The generating includes encoding each group of data bits in a portion of the data signal that corresponds to one section of the clock signal.

One embodiment includes an apparatus comprising a circuit for dividing a clock signal into sections that each includes a plurality of time intervals. There is a one-to-one association between a plurality of data states and the time intervals. The apparatus also comprises an encoder for generating a data signal that stores a group of data bits per each section of the clock signal. The encoder associates one of a plurality of time intervals with each group of data bits based on the one-to-one association between the plurality of data states and the time intervals. The encoder generates a data signal based on the time interval associated with each group of data bits. The encoder encodes each group of data bits in a portion of the data signal that corresponds to one section of the clock signal.

One embodiment includes a method for decoding a data signal. The method comprises dividing a clock signal into sections that each include $2^n$ time intervals. Each time interval in a section is associated with one of $2^n$ data states, wherein "n" is an integer greater than 1. A transition is detected from a first level to a second level in a first portion of a data signal. The portion corresponds to a first section of the clock signal. The time interval of the clock signal at which the transition in the data signal occurred is determined. "N" bits of data are determined for the first portion of the data signal based on the data state associated with the time interval at which the transition occurred, the "n" bits corresponding to one of $2^n$ data states.

One embodiment includes an apparatus comprising a circuit that divides a clock signal into sections that each includes $2^n$ time intervals, wherein each time interval in a section is associated with one of $2^n$ data states, and "n" is an integer greater than 1. The apparatus also comprises a decoder that detects a transition from a first level to a second level in a first portion of a data signal. The first portion corresponds to a first section of the clock signal. The decoder determines the time interval of the clock signal at which the transition in the data signal occurred. The decoder determines "n" bits of data for the first portion of the data signal based on the data state associated with the time interval at which the transition occurred, wherein the "n" bits correspond to one of $2^n$ data states.

One embodiment includes a method comprising accessing a clock signal, and dividing the clock signal into sections that each includes $2^n$ successive time intervals. Each time interval in a section is associated with one of $2^n$ data states, with "n"

being an integer greater than 1. The method further comprises accessing a plurality of groups of data bits. Each group of data bits having one of $2^n$ data states, with there being a one-to-one association between the $2^n$ data states and the $2^n$ successive time intervals. Each group of data bits includes at least two data bits. Each group of data bits is associated with one section of the clock signal. One of the $2^n$ time intervals is determined for each group of data bits based on the one-to-one association between the $2^n$ data states and the $2^n$ successive time intervals. A data signal is encoded based on the section of the clock signal associated with each group of data bits and the time interval associated with each group of data bits. The encoding includes transitioning the data signal no more than once per group of data bits.

One embodiment includes an apparatus comprising a circuit that divides a clock signal into sections that each includes $2^n$ successive time intervals. Each time interval in a section is associated with one of $2^n$ data states, with "n" being an integer greater than 1. There is a one-to-one association between the $2^n$ successive time intervals and $2^n$ data states. The apparatus has an encoder that accesses a plurality of groups of data bits, with each group of data bits having one of the $2^n$ data states. Each group of data bits includes at least two data bits, the encoder associates each group of data bits with one section of the clock signal. The encoder determines one of the $2^n$ time intervals for each group of data bits based on the one-to-one association between the $2^n$ data states and the $2^n$ successive time intervals. The encoder encodes a data signal based on the section of the clock signal associated with each group of data bits and the time interval associated with each group of data bits. The encoding includes transitioning the data signal no more than once per group of data bits.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method comprising:
   accessing, by a transmitter circuit, a plurality of groups of data bits, each group of data bits having one of $2^n$ data states, wherein each group includes at least two data bits;
   associating, by the transmitter circuit, each group of data bits with one section of a clock, including associating at least four data bits per each cycle of the clock;
   determining, by the transmitter circuit, $2^n$ successive time intervals per section of the clock, there being a one-to-one association between the $2^n$ data states and the $2^n$ successive time intervals;
   associating, by the transmitter circuit, each group of data bits with one of the $2^n$ successive time intervals based on the one-to-one association between the $2^n$ data states and the $2^n$ successive time intervals; and
   generating, by the transmitter circuit, a data signal based on the section of the clock associated with each group of data bits and the time interval associated with each group of data bits, wherein the generating includes encoding each group of data bits in a portion of the data signal that corresponds to one section of the clock, encoding at least four data bits per each cycle of the clock, encoding all but one of the $2^n$ data states as a transition in the data signal, wherein the transition for encoding a particular data state occurs during the time interval associated with the particular data state, and encoding one of the $2^n$ data states as a constant level in the data signal for a duration of one section of the clock.

2. The method of claim 1, wherein the encoding all but one of the $2^n$ data states as the transition in the data signal includes:
   transitioning the data signal from a first level to a second level during a first of the $2^n$ successive time intervals that is associated with the data state for a first group of the data bits, the first time interval of the $2^n$ successive time intervals is in a first section of the clock that is associated with the first group of data bits.

3. The method of claim 1, further comprising:
   accessing a version of the clock at a receiver circuit;
   receiving the data signal at the receiver circuit from the transmitter circuit; and
   decoding a first group of the data bits in the data signal at the receiver circuit, the decoding including:
   detecting a transition in a first portion of the data signal that corresponds to a first section of the clock; and
   determining which of the $2^n$ successive time intervals per section of the clock that the transition occurred in.

4. The method of claim 1, wherein the section of the clock is one half of a clock cycle of the clock.

5. The method of claim 1, wherein the generating the data signal includes transitioning the data signal no more than once per group of data bits regardless of the data state being encoded.

6. An apparatus comprising:
   a circuit that is configured to access an external clock from a source external to the apparatus and to generate an internal clock having $2^n$ successive time intervals per section of the external clock, wherein "n" is at least two; and
   an encoder that is configured to access a plurality of groups of data bits, each group of data bits having one of $2^n$ data states, wherein each group of data bits includes at least two data bits, there being a one-to-one association between the $2^n$ data states and the $2^n$ successive time intervals, wherein the encoder is configured to associate each group of the data bits with one section of the external clock, wherein the encoder is configured to associate at least four data bits per each cycle of the external clock, wherein the encoder is configured to associate each group of data bits with one of the $2^n$ successive time intervals based on the one-to-one association between the $2^n$ data states and the $2^n$ successive time intervals, wherein the encoder is configured to generate a data signal based on the section of the external clock associated with each group of data bits and the time interval in the internal clock associated with each group of data bits, wherein the encoder is configured to encode each group of data bits in a portion of the data signal that corresponds to one section of the external clock and to encode at least four data bits per each cycle of the external clock, wherein the encoder is configured to encode all but one of the $2^n$ data states as a transition in the data signal, wherein the transition for encoding a particular data state occurs during the time interval in the internal clock associated with the particular data state, wherein the encoder is configured to encode one of the $2^n$ data states as a constant level in the data signal for the duration of one section of the external clock.

7. The apparatus of claim 6, wherein the encoder being configured to encode all but one of the $2^n$ data states as the transition in the data signal comprises the encoder being configured to transition the data signal from a first level to a second level during a first of the $2^n$ successive time intervals that is associated with the data state for a first group of the data bits, the first time interval of the $2^n$ successive time intervals is in a first section of the external clock that is associated with the first group of data bits.

8. The apparatus of claim 6, wherein the section of the external clock is one half of a clock cycle of the external clock.

9. The apparatus of claim 6, wherein the encoder being configured to generate the data signal includes the encoder being configured to transition the data signal no more than once per section of the external clock regardless of the data state being encoded.

10. A method for decoding a data signal, the method comprising:
  accessing, by a receiver circuit, a clock signal;
  dividing, by the receiver circuit, the clock signal into $2^n$ successive time intervals for each half clock cycle of the clock signal, wherein each time interval of the $2^n$ successive time intervals in a given half clock cycle of the clock signal is associated with one of $2^n$ data states, wherein "n" is an integer greater than one;
  accessing, at the receiver circuit, a data signal from a transmitter circuit;
  detecting, by the receiver circuit, a transition from a first level to a second level in a first portion of the data signal, the portion corresponds to a first half clock cycle of the clock signal;
  determining the time interval of the $2^n$ successive time intervals in the first half clock cycle of the clock signal at which the transition in the data signal occurred;
  determining "n" bits of data for the first portion of the data signal based on the data state associated with the time interval at which the transition occurred, the "n" bits corresponding to one of $2^n$ data states, wherein "n" data bits are determined in the data signal for the first half clock cycle of the clock signal;
  accessing a second portion of the data signal that corresponds to a second half clock cycle of the clock signal;
  determining whether there is a transition of the data signal within the second portion;
  determining that the data state for the second portion of the data signal is a default state if there is no transition in the second portion; and
  determining that the data state for the second portion is the data state that corresponds to the time interval in which the transition occurred if there is a transition in the second portion.

11. The method of claim 10, wherein the dividing the clock signal into $2^n$ time successive intervals for each half clock cycle of the clock signal includes:
  generating a plurality of timing signals, each of the timing signals is associated with one of the $2^n$ time successive time intervals.

12. The method of claim 10, further comprising:
  repeating the detecting a transition, the determining the time interval, and the determining "n" bits of data for other portions of the data signal that correspond to other half clock cycles of the clock signal, wherein "n" data bits are decoded from the data signal for each half clock cycle of the clock signal.

13. An apparatus comprising:
  a circuit that accesses a clock signal, wherein the circuit divides the clock signal into $2^n$ time successive intervals for each half clock cycle of the clock signal, each time interval in a given half clock cycle is associated with one of $2^n$ data states, "n" is an integer greater than one; and
  a decoder that accesses a data signal from an external interface of the apparatus, the decoder detects a transition from a first level to a second level in a first portion of a data signal, the first portion corresponds to a first half clock cycle of the clock signal, the decoder determines the time interval of the $2^n$ successive time intervals in the first half clock cycle of the clock signal at which the transition in the data signal occurred, the decoder determines "n" bits of data for the first portion of the data signal based on the data state associated with the time interval at which the transition occurred, the "n" bits corresponding to one of $2^n$ data states, wherein "n" data bits are determined in the data signal for the first half clock cycle of the clock signal; accesses a second portion of the data signal that corresponds to a second half clock cycle of the clock signal; determines whether there is a transition of the data signal within the second portion of the data signal; determines that the data state for the second portion of the data signal is a default state if there is no transition in the second portion; and determines that the data state for the second portion is the data state that corresponds to the time interval in which the transition occurred if there is a transition in the second portion.

14. The apparatus of claim 13, wherein the decoder is configured to repeat the detecting a transition, the determining the time interval, and the determining "n" bits of data for other portions of the data signal that correspond to other half clock cycles of the clock signal, wherein "n" data bits are decoded from the data signal for each half clock cycle of the clock signal.

15. A method comprising:
  accessing, by a first circuit, a first clock signal;
  generating, by the first circuit, a second clock signal that has $2^n$ successive time intervals per each half cycle of the first clock signal, "n" being an integer greater than one;
  accessing, by the first circuit, a plurality of groups of data bits, each group of data bits having one of $2^n$ data states, there being a one-to-one association between the $2^n$ data states and the $2^n$ successive time intervals, each group of data bits includes at least two data bits;
  associating, by the first circuit, each group of data bits with one half cycle of the first clock signal, including determining a first half cycle of the first clock signal during which a first group of the data bits are to be transmitted in a data signal;
  determining, by the first circuit, one of the $2^n$ time intervals in the second clock signal for each group of data bits based on the one-to-one association between the $2^n$ data states and the $2^n$ successive time intervals, including determining a first time interval of the $2^n$ successive time intervals for the first group of data bits; and
  encoding, by the first circuit, the data signal based on the half cycle of the first clock signal associated with each group of data bits and the time interval in the second clock signal associated with the data state of each group of data bits, wherein "n" data bits are encoded in the data signal for each half clock cycle of the first clock signal, wherein the encoding includes transitioning the data signal no more than once per group of data bits regardless of the data state being encoded, including transitioning the data signal at a point that corresponds to the first time interval of the second clock signal if the data state is not a default state, and holding the data signal at a constant level throughout the first half cycle of the first clock signal if the data state is the default state.

16. The method of claim 15, wherein the transitioning the data signal at the point that corresponds to the first time interval of the second clock signal if the data state is not the default state includes determining a time interval of the second clock signal at which to transition the data signal based on the one-to-one association between the $2^n$ data states and the $2^n$ successive time intervals in the second clock signal.

17. The method of claim 15, further comprising:
transmitting the encoded data signal from the first circuit to a second circuit, wherein the first circuit accesses the first clock from a source external to the first circuit.

18. An apparatus comprising:
a circuit that accesses a first clock signal and that generates a second clock signal that has $2^n$ successive time intervals per each half cycle of the first clock signal, wherein each of the $2^n$ successive time intervals is associated with one of $2^n$ data states, "n" is an integer greater than one, there being a one-to-one association between the $2^n$ successive time intervals and $2^n$ data states; and
an encoder that accesses a plurality of groups of data bits, each group of data bits having one of the $2^n$ data states, each group of data bits includes at least two data bits, the encoder associates each group of data bits with one half cycle of the first clock signal, the encoder determines one of the $2^n$ successive time intervals in the second clock signal for each group of data bits based on the one-to-one association between the $2^n$ data states and the $2^n$ successive time intervals, the encoder encodes a data signal based on the half cycle of the first clock signal associated with each group of data bits and the time interval in the second clock signal associated with the data state of each group of data bits, wherein at least two data bits are encoded in the data signal for each half clock cycle of the first clock signal, wherein the encoder transitions the data signal no more than once per group of data bits regardless of the data state being encoded, wherein the encoder transitions the data signal at a point that corresponds to a time interval of the second clock signal if the data state is not a default state, and the encoder holds the data signal at a constant level throughout the half cycle of the first clock signal if the data state is the default state.

19. The apparatus of claim 18, wherein the encoder determines the time interval of the second clock signal at which to transition the data signal based on the one-to-one association between the $2^n$ data states and the $2^n$ successive time intervals.

* * * * *